US011893112B2

(12) United States Patent
Guilley et al.

(10) Patent No.: US 11,893,112 B2
(45) Date of Patent: Feb. 6, 2024

(54) QUANTITATIVE DIGITAL SENSOR

(71) Applicant: SECURE-IC SAS, Cesson-Sevigne (FR)

(72) Inventors: Sylvain Guilley, Paris (FR); Adrien Facon, Paris (FR); Nicolas Bruneau, Montrouge (FR)

(73) Assignee: SECURE-IC SAS, Cesson-Sevigne (FR)

( * ) Notice: Subject to any disclaimer, the term of this patent is extended or adjusted under 35 U.S.C. 154(b) by 834 days.

(21) Appl. No.: 16/954,507

(22) PCT Filed: Nov. 21, 2018

(86) PCT No.: PCT/EP2018/082062
§ 371 (c)(1),
(2) Date: Jun. 16, 2020

(87) PCT Pub. No.: WO2019/129439
PCT Pub. Date: Jul. 4, 2019

(65) Prior Publication Data
US 2021/0004461 A1    Jan. 7, 2021

(30) Foreign Application Priority Data
Dec. 27, 2017  (EP) ..................................... 17306945

(51) Int. Cl.
*G06F 21/55*    (2013.01)
*G06N 20/00*    (2019.01)
(Continued)

(52) U.S. Cl.
CPC ..... *G06F 21/554* (2013.01); *G01R 31/31719* (2013.01); *G06F 11/3003* (2013.01);
(Continued)

(58) Field of Classification Search
CPC ............... G06F 21/554; G06F 11/3003; G06F 11/3058; G06F 11/3082; G06F 11/3495;
(Continued)

(56) References Cited

U.S. PATENT DOCUMENTS 10,530,749 B1 * 1/2020 Park .................... H04L 63/0245
2007/0033417 A1 * 2/2007 Gammel .............. H03M 13/116
713/189
(Continued)

FOREIGN PATENT DOCUMENTS

| EP | 2 960 665 A1 | 12/2015 |
|---|---|---|
| WO | 2012/122309 A2 | 9/2012 |
| WO | 2015/027070 A1 | 2/2015 |

OTHER PUBLICATIONS

Tunstall, et al., "Differential Fault Analysis of the Advanced Encryption Standard Using a Single Fault", WISTP, vol. 6633 of Lecture Notes in Computer Science, pp. 224-233, Springer, 2011.
(Continued)

*Primary Examiner* — Carl G Colin
*Assistant Examiner* — Zhe Liu
(74) *Attorney, Agent, or Firm* — BakerHostetler

(57) ABSTRACT

There is provided a device of protecting an Integrated Circuit from perturbation attacks. The device includes a sensing unit configured to detect a perturbation attack, the sensing unit comprising a set of digital sensors comprising at least two sensors, the sensors being arranged in parallel. Each digital sensor provides a digitized bit output having a binary value, in response to input data, the sensing unit being configured to deliver at least one binary vector comprising a multi-bit value, the multi-bit value comprising at least two bit outputs provided by the set of digital sensors. The sensing device further comprising an analysis unit, the analysis unit being configured to receive at least one binary vector
(Continued)

provided by the sensing unit, the analysis unit being configured to detect a perturbation attack from the at least one binary vector.

17 Claims, 19 Drawing Sheets

(51) Int. Cl.
 G06F 11/30 (2006.01)
 G06F 21/75 (2013.01)
 G01R 31/317 (2006.01)
 G06F 11/34 (2006.01)
(52) U.S. Cl.
 CPC ...... *G06F 11/3058* (2013.01); *G06F 11/3082* (2013.01); *G06F 11/3495* (2013.01); *G06F 21/75* (2013.01); *G06N 20/00* (2019.01); *G06F 2221/034* (2013.01)
(58) Field of Classification Search
 CPC ... G06F 21/75; G06F 2221/034; G06N 20/00; G01R 31/31719
 See application file for complete search history.

(56) References Cited

U.S. PATENT DOCUMENTS

| | | | |
|---|---|---|---|
| 2010/0078636 A1 | 4/2010 | Zachariasse | |
| 2014/0088736 A1* | 3/2014 | Cohen | G05B 9/03 700/79 |
| 2014/0281643 A1 | 9/2014 | Tiri et al. | |
| 2015/0192637 A1 | 7/2015 | Falk et al. | |
| 2016/0314322 A1* | 10/2016 | Van De Haar | G06F 21/73 |
| 2016/0330216 A1* | 11/2016 | Kishinevsky | G06F 21/75 |
| 2017/0310688 A1* | 10/2017 | Lecomte | H04L 9/3278 |
| 2018/0006830 A1* | 1/2018 | Cambou | G06F 21/44 |
| 2018/0145838 A1* | 5/2018 | Wang | H04L 9/3278 |
| 2018/0342468 A1* | 11/2018 | Rajendran | G06F 30/327 |

OTHER PUBLICATIONS

Joye, et al. "Fault Analysis in Cryptography", Springer, pp. 224-233, Mar. 2011.
Herder, et al., "Physical Unclonable Functions and Applications: A Tutorial", Proceedings of the IEEE, vol. 102, Issue 8, pp. 1126-1141, Aug. 1, 2014.

* cited by examiner

|       |   |   |   |   |   |   |   |   |   |   |   |
|-------|---|---|---|---|---|---|---|---|---|---|---|
| I     | 0 | 1 | 0 | 1 | 0 | 1 | 0 | 1 | 0 | 1 | 0 |
| $O_1$ | 1 | 0 | 1 | 0 | 1 | 0 | 1 | 0 | 1 | 0 | 1 |
| $O_2$ | 1 | 0 | 1 | 0 | 1 | 0 | 1 | 0 | 1 | 0 | 1 |
| ⋮     | 1 | 0 | 1 | 0 | 0 | 0 | 1 | 0 | 1 | 0 | 1 |
| $O_{th}$ | 1 | 0 | 1 | 1 | 0 | 1 | 1 | 0 | 1 | 1 | 1 |
| $O_{th+1}$ | 0 | 1 | 0 | 1 | 0 | 1 | 0 | 0 | 0 | 1 | 0 |
| $O_{th+2}$ | 0 | 1 | 0 | 1 | 0 | 1 | 0 | 1 | 0 | 1 | 0 |
| ⋮     | 0 | 1 | 0 | 1 | 0 | 1 | 0 | 1 | 0 | 1 | 0 |
| $O_n$ | 0 | 1 | 0 | 1 | 0 | 1 | 0 | 1 | 0 | 1 | 0 |

FIG.7

QUANTITATIVE DIGITAL SENSOR

CROSS-REFERENCE TO RELATED APPLICATIONS

This application is a National Stage of International patent application PCT/EP2018/082062, filed on Nov. 21, 2018, which claims priority to foreign European patent application No. EP 17306945.1, filed on Dec. 27, 2017, the disclosures of which are incorporated by reference in their entirety.

TECHNICAL FIELD

The invention generally relates to digital circuits, and in particular to methods, systems, and computer program products for protecting an Integrated Circuit (1) from perturbation attacks.

BACKGROUND

Most of the embedded devices such as for example smartcards, cellphones, set-top boxes, use cryptographic algorithms (also called ciphers) to secure their data. Such cryptographic algorithms are implemented in the embedded devices by use of hardware encryption and/or decryption circuits. However, such hardware circuits may result in security vulnerabilities.

Embedded devices based on integrated circuits can be threatened by two types of physical attacks: observation attacks, also called side channel attacks, and perturbation attacks, also called fault injection attacks. Such attacks are intended to obtain secret information, such as the key of an encryption algorithm, in order to decrypt the encrypted information comprised in an embedded device.

Perturbation attacks of fault injection attack type can be achieved through the injection of malicious faults into a cryptographic device and the observation of the corresponding erroneous outputs. With such type of attacks, the number of experiments needed by an attacker to obtain secret information can be reduced.

In particular, cryptanalysis can be made using faulty computation in cryptographic primitives as disclosed in Marc Joye and Michael Tunstall. "*Fault Analysis in Cryptography*". Springer LNCS, March 2011. http://joye.site88.net/FAbook.html.DOI:10.1007/978-3-642-29656-7; ISBN 978-3-642-29655-0.

Fault attacks can target the execution of a program, and can bypass security-critical operations, or jump over security tests, etc. All of those effects, if adequately handled by the attacker, lead to a break of the chip security.

Countermeasures against perturbation attacks have become a major challenge for the security of embedded devices.

For instance, it is known that a single fault on an AES-128 may under certain conditions suffice to reveal its key, as disclosed in:

Marc Joye and Michael Tunstall. *Fault Analysis in Cryptography*. Springer LNCS, March 2011.http://joye.site88.net/FAbook.html.DOI:10.1007/978-3-642-29656-7; ISBN 978-3-642-29655-0; and Michael Tunstall, Debdeep Mukhopadhyay, and Subidh Ali. Differential Fault Analysis of the Advanced Encryption Standard Using a Single Fault. In Claudio Agostino Ardagna and Jianying Zhou, editors, *WISTP*, volume 6633 of *Lecture Notes in Computer Science*, pages 224-233. Springer, 2011.

Existing countermeasures are designed to prevent faults from leading to the disclosure of erroneous values, thereby preventing their exploitation by an attacker to extract secrets.

Solutions have been proposed against perturbation attacks consisting in detecting abnormal operational environment by detecting specific values of some environmental parameters (for example out of predefined ranges parameters values) using sensors, such as temperature, voltage, clock frequency, critical path, etc.

The solution as described in EP2960665, discloses a device for detecting abnormal critical path. In EP2960665, there is specifically disclosed a calibration device for calibrating a digital sensor, the digital sensor being configured to protect a target digital circuit fed by a clock signal having a clock period by triggering an alarm depending on a triggering condition related to the clock period and to an optimal alarm threshold, the optimal alarm threshold being determined by minimizing a quantity depending on the probability of occurrence of false positives and on the probability of occurrence of false negatives.

A digital sensor protects a digital circuit or sub-circuit against attacks by triggering an alarm, depending on triggering conditions.

However, conventional approaches based on the detection of abnormal parameter values using sensors lead to Boolean alarms, thereby lacking interpretability. In particular, it is not possible to identify if an alarm is a false positive or is actually caused by an attack attempt.

As the hardware implementation of some cryptographic algorithms such as AES (Advanced Encryption Standard) executes in a small number of clock cycles (10 clock cycles for AES-128), the reaction of the sensors is by definition required to be fast. However, existing approaches are based on discrimination between false and true positives, which requires time to collect statistics and to compute a decision. As fault attack can lead to exploitation within a very limited time frame, such approach is accordingly incompatible with the security requirements.

Improved systems, methods, and computer program products for protecting Integrated Circuits from attacks are therefore needed.

SUMMARY

In order to address these and other problems, there is provided a device for protecting an Integrated Circuit from perturbation attacks, the device comprising a sensing unit configured to detect a perturbation attack. The sensing unit comprises a set of digital sensors comprising at least two sensors, the sensors being arranged in parallel, each digital sensor providing a digitized bit output having a binary value, in response to input data. The sensing unit may be configured to deliver at least one binary vector comprising a multi-bit value, the multi-bit value comprising at least two bit outputs provided by the set of digital sensors. The sensing device may further comprise an analysis unit, the analysis unit being configured to receive at least one binary vector provided by the sensing unit, the analysis unit being configured to detect a perturbation attack from the at least one binary vector.

In one embodiment, the analysis unit may be configured to determine a quantity representing a quantitative and/or qualitative estimation of the detected perturbation attack and/or a classification of the detected perturbation attack from the at least one binary vector.

Each sensor of the sensing unit may comprise:

an input memory block for storing input data;
a first data path for propagating the input data and forming a first delay chain;
a second data path for propagating the input data and forming a second delay chain.

The input memory block and the second path may further comprise combinatorial cells configured to determine the bit output of the sensor using the input data.

The input memory block may comprise an input memory element for storing an input data generated using a stimuli generator, the first data path being configured to propagate data from the input memory element to a buffer element which buffers the data propagated through the initial delay chain.

In an embodiment, the device may further comprise an output memory associated with each sensor for storing the bit output delivered by the sensor.

The second data path of a given sensor forms a delay chain in echelon, the second data path propagating the value bit from the buffer element to the output memory associated with the given sensor.

In another embodiment, the device may further comprise an output memory configured to store the bit outputs delivered by the sensors.

In an embodiment, the device may further comprise a register configured to store the value of the bit outputs delivered by the sensors at different instant times.

In some embodiments, the sensing unit may comprise at least one pair of sensors, each pair of sensors comprising a reference sensor and a redundant sensor, the sensors of each pair being adjacent, the reference sensor and the redundant sensor being interleaved, the sensing unit being configured to deliver a first vector comprising the bit outputs of the reference sensor and a second vector comprising the bit outputs of the redundant sensor, the analysis unit being configured to classify a detected perturbation attack from a comparison between the first vector and the second vector.

The first output vector and the second output vector may have a same bit size, the analysis unit being configured to classify a detected perturbation attack as a local attack if it determines that the first vector and the second vector differ with respect to each other in Hamming distance of a value strictly greater than one.

The analysis unit may be further configured to classify a detected perturbation attack as a local attack if it determines that the successive values of the first vector and the second vector differ with respect to each other in Hamming distance of a value strictly greater than one.

The nominal value of the bit outputs may be set to zero and the analysis unit may be configured to classify a detected perturbation attack as a local attack by further determining whether the bit outputs are not monotonous.

In an embodiment, the analysis unit may comprise an aging function configured to estimate the aging level of the target circuit, the sensing unit comprising at least a SRAM PUF, each output of the SRAM PUF corresponding to a sensor output.

In some embodiments, the analysis unit may be configured to compute an attack risk level from the estimate aging level.

In some embodiments, the aging function may be configured to measure the value of each bit delivered by a SRAM PUF, and to compute a mean value taking into account the measured bit values, the mean value representing an estimation of the reliability of the SRAM-PUF, the analysis unit being configured to determine the aging of the circuit from the reliability.

In some embodiments, a digitized bit output may be provided by each digital sensor at each clock period of a system clock. The digitized bits provided at a given clock period may be monitored at every clock period or at each clock period of the system clock.

In some embodiments, the analysis unit may comprise a classifier configured to classify alarms as false or true positives from digitized bit outputs provided by the set of digital sensors. The classifier may implement a machine learning algorithm chosen in a group comprising Support Vector Machines, Random Forests, Bayes, Rotation Forest, multiboost algorithm, and the clustering algorithm.

In some embodiments, the classifier may be configured to built an attack classification model by performing a first learning phase and a second learning phase, the first learning phase comprising determining the sensor outputs using one or more integrated circuits, determining the sensor outputs in different operational conditions, and determining the sensor outputs over a predefined learning time interval. The second learning phase may comprise performing one or more attacks to an integrated circuit.

In some embodiments, the sensing unit may comprise additional heterogeneous sensors configured to generate data by monitoring different physical parameters and/or different software activities performed by the integrated circuit, the analysis unit being configured to aggregate data generated by at least some of the additional heterogeneous sensors and to select the sensors that have a lowest variability.

In some embodiments, an additional sensor may be chosen in a group comprising software sensors configured to monitor activities of a processor or a given peripheral of the integrated circuit, software sensors configured to monitor congestion on a system bus, software sensors configured to monitor hardware performance counters, software sensors configured to monitor software stack, and physical sensors configured to measure temperature or pressure or voltage or frequency or light or current in substrate or movement.

In some embodiments, the one or more of the digital sensors may be configured to upload the digitized bit output to a remote uplink server, the remote uplink server being configured to update a classification model depending on the digitized bit.

There is further provided a method for protecting an Integrated Circuit from perturbation attacks, wherein the method comprises a step of detecting a perturbation attack using a set of digital sensors comprising at least two sensors, the sensors being arranged in parallel, each digital sensor providing a digitized bit output having a binary value, in response to input data, said step of detecting a perturbation attack comprising determining at least one binary vector comprising a multi-bit value, said multi-bit value comprising at least two bit outputs provided by said set of digital sensors, the method comprising detecting a perturbation attack from said at least one binary vector.

There is also provided a computer program comprising instructions for carrying out the steps of the method.

The above summary presents a simplified summary in order to provide a basic understanding of some aspects of the systems and/or methods discussed herein. This summary is not intended to provide an extensive overview of the systems and/or methods discussed herein.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, given for illustration purposes only, serve to explain the embodiments of the invention.

FIG. 7 is a diagram representing exemplary variations in time of the status output bits, according to one embodiment.

DETAILED DESCRIPTION

Figure 1:
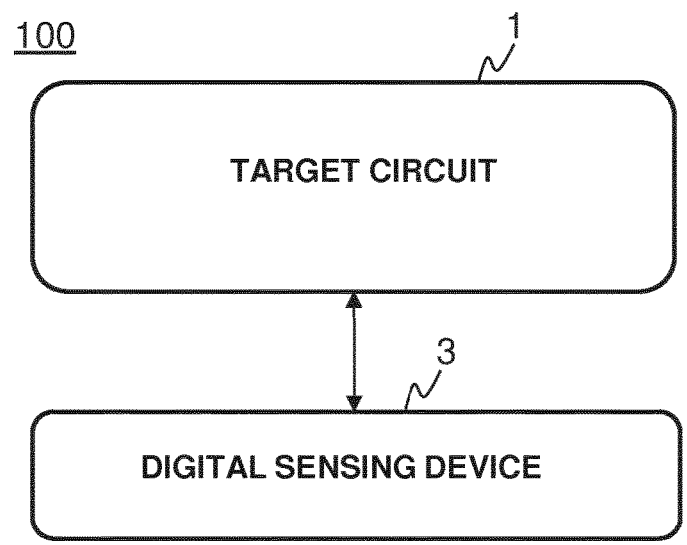
FIG. 1 is a diagrammatic view of a protection system comprising a digital circuit, according to some embodiments.

Referring to FIG. 1, there is shown a system 100 comprising a digital circuit or sub-circuit 1 (also referred to as a "target circuit" or "protected target"). The target circuit 1 is fed by a clock signal having a clock period. The system 100 further comprises a detection device 3, also referred to hereinafter as a "quantitative digital sensor" or simply as a "digital sensor" or "sensing device". The digital sensor 3 may be configured to detect perturbation attacks performed on the digital circuit 1. The digital sensor 3 may be further configured to perform a real-time diagnosis of the detected perturbation attacks.

The target circuit 1 may be part of an integrated circuit device (IC device) which may be for example any embedded device or system manipulating and/or incorporating secret data and/or requiring a level of integrity, such as a smart card, a secure device, a multimedia player, a recorder, or a mobile storage device like memory cards and hard discs. Such IC device may be used in a wide range of communication and data processing applications such as in the automotive industry, in secure access solutions, in mobile phone devices, in payment domains such as banking schemes, etc. An operating environment 10 in accordance with embodiments of the invention is shown. The IC device may implement one or more cryptographic mechanisms to ensure security, authentication, protection and/or privacy of data during the storage of data within the IC device and/or the transmission of data. The cryptographic mechanisms may employ cryptographic keys to generate ciphered data (also referred to as "ciphertext") from original data (also referred to as "plaintext"), the access to the data requiring application of a decryption mechanism and knowledge of the cryptographic keys used to encrypt the original data.

Figure 3:
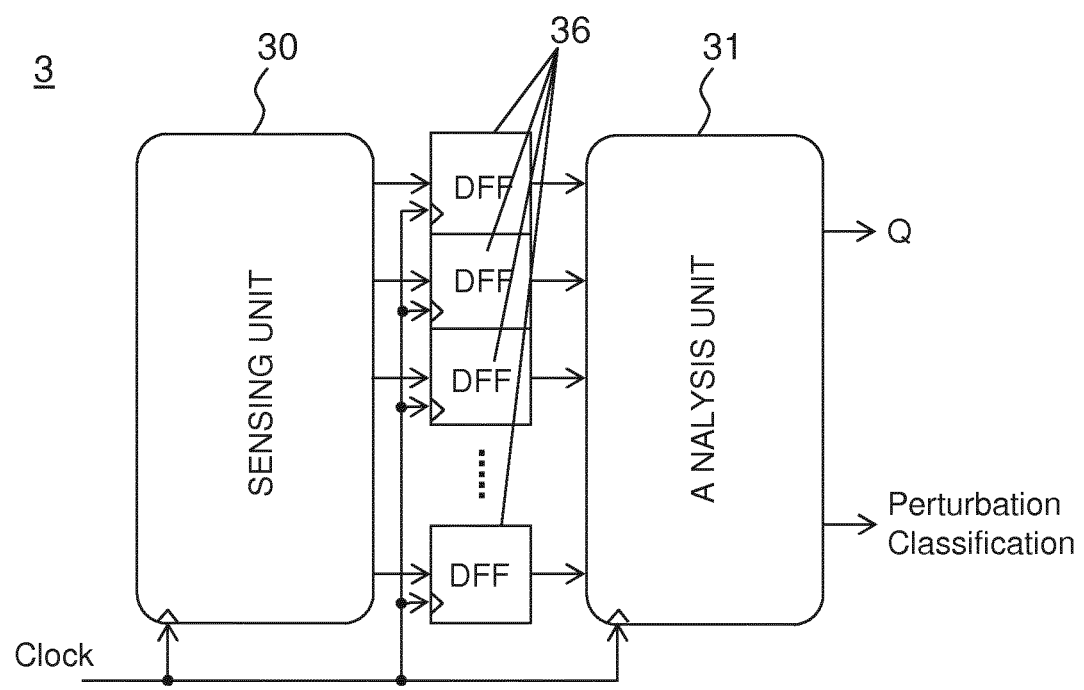
FIG. 3 is a diagrammatic view of detection device, according to one embodiment.

It should be noted that, although the digital sensor 3 and the target digital circuit 1 are represented as separate functional blocks in FIG. 3, they may be alternatively implemented on a same circuit, or in a SOC (System on Chip) in some embodiments.

Figure 2:
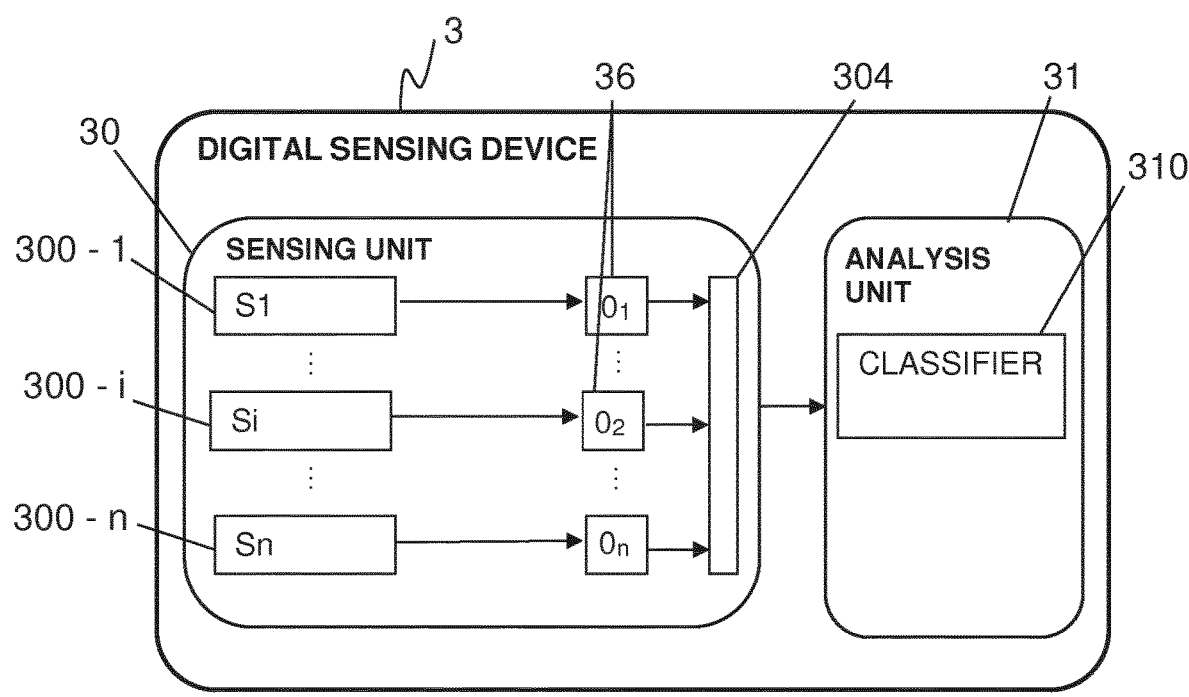
FIG. 2 is a diagrammatic view of a detection device, according to some embodiments.

FIG. 2 represents a diagrammatic view of the detection device 3, according to some embodiments. The detection device 3 may comprise:

a sensing unit 30 configured to deliver a stream of multiple bits $O_1, \ldots O_i, \ldots, O_n$, and an analysis unit 31 configured to detect in real-time a perturbation attack directed to the target circuit 1 from the stream of multiple bits received from the sensing unit 30.

The sensing unit 30 may use hardware to deliver a stream of multiple bits. The sensing unit 30 can thus measure a status in real-time.

The detection against fault injection attacks, according to the embodiments of the invention, benefits from a real-time measurement and analysis, so as to leave no blind spots in time. Advantageously, the detection device 3 does not leave any weak time when an injection would be more favorable to the attacker. Both detection and analysis methods according to the various embodiments of the invention can detect in real-time, due to hardware implementation.

In one embodiment, the sensing unit 30 may comprise a set of n binary digital sensors $300\text{-}1, \ldots, 300\text{-}i, \ldots, 300\text{-}n$ (with $n \geq 1$), comprising at least two sensors, the digital sensors being arranged in parallel. The sensors will be generally referred to hereinafter using reference '300'.

The stream of multiple bits $O_1, \ldots O_i, \ldots, O_n$ delivered by the sensing unit 30 may comprise a set of digitized sensing outputs, each sensing output $O_i$ being derived from the output of each sensor 300-$i$. Each output $O_i$ is a binary value (bit value) having a value equal to '0' (zero) or '1' (one). For the sake of detection of a perturbation, the digitized output bits $O_i$ values provided at a given clock period of the system clock may be monitored:

At every other clock period: in which case all events correspond to the same edge polarity propagation);

At each clock period: in which case both delays corresponding to 0 and 1 may be measured, each possibility with of different duration; this advantageously provides dual environment measurement since rising and falling edges propagation mobilize different (actually "complementary") transistors in the CMOS gates.

The number of sensing signals delivered by the sensing unit 30 is denoted n, i being comprised between 1 and n. The digital sensor 3 is digital.

The digital sensor 3 thus provides a multi-bit output (multivariate output) comprising a set of bits $O_i$.

The sensors 300 may be of different types or of a same type. In embodiments where the sensors 300 comprise at least two sensors of the same type, these sensors of the same type may have a different or a same sensibility. Sensors may function in independent mode or be linked together to provide complied sensing information.

In one embodiment, the sensing unit 30 may further comprise an output memory 4 to store the bit outputs $O_i$ delivered by one or more sensors. In one embodiment, the output memory 4 may comprise a plurality of output memory elements 36.

In some embodiments, an output memory element 36 may be associated with each sensor 300. Alternatively, an output memory element 36 may be associated with a set of at least two sensors 300 and may be configured to store the bit outputs $O_i$ of the sensors comprised in such set of sensors. Each output memory element 36 is thus connected to at least one output of the sensors 300.

Each output memory element 36 may be configured to trigger a read of the associated sensor output, for example periodically or on dedicated event(s) apparition such as movement detection, crossing of a threshold (of temperature, humidity, etc.).

The following description of some embodiments of the invention will be made with reference to an output memory element 36 associated with each sensor 300 (thereby each output memory element 36 is connected to the output of one of the sensors 300), for illustration purpose only.

The sensing unit 30 thus provides a collection of n>1 binary sensing outputs $O_1, \ldots, O_i, \ldots, O_n$. In one embodiment, the sensing unit may directly deliver the set of binary sensing outputs to the analysis unit 31. Alternatively, the sensing unit 300 may comprise a post processing block 304 to determine an output vector V (also referred to as a "sensing vector" hereinafter) from the set of binary sensing outputs, the vector being delivered to the analysis unit 31. In one embodiment, the i-th component of the sensing vector V may be the bit output $O_i$ delivered by the i-th sensor 300-i. Alternatively, the i-th component of the sensing vector V may be an output bit derived from the one or more output bits delivered by the sensor 300. To facilitate the understanding of the invention and for simplification and illustration purpose only, the following description of some embodiments of the invention will be made with reference to a sensing vector V comprising n components, the i-th component being the output bit delivered by the i-th sensor 300-i:

$$V = [O_1, \ldots, O_i, \ldots, O_n] \quad (1)$$

Referring to FIG. 3, each sensing output $O_i$ may be stored in a memory 36 such as for example a Data Flip Flop (DFF).

In some embodiments, the analysis unit 31 may be configured to detect faults or aging from the output of the sensing unit 30, and in particular from the sensing vector V.

In some embodiments, the analysis unit 31 may determine, in response to the detection of a perturbation attack, a quantity Q representing a quantitative estimation of the detected perturbation attack and/or a classification of the detected perturbation attack.

The quantitative digital sensing device 3 according to the invention may be configured to ensure that no false alarm (also referred to as "false positive") is raised unless the target circuit 1 is in out-of-specifications operating conditions to avoid erasure of all valuable data in the target circuit (safety condition). Further, the quantitative digital sensing device 3 may be configured to ensure that no false negative arise. In other words, in response to the successful creation of a faulty computation into the targeted digital circuit 1 by an attacker, the quantitative digital sensing device 3 may ensure that an alarm is actually raised to prevent that some security events be missed (security condition).

As used herein, a "false positive error" or in short "false positive", also called a "false alarm" refers to the test of an alarm condition (which can have a "true" or "false" result value) that erroneously indicates that an alarm condition has been fulfilled, while it has not been fulfilled actually.

Further, as used herein, a "false negative" error, also referred to as a "false negative", refers to the test of an alarm condition indicating that the alarm condition failed, while it actually was successful.

According to some embodiments, the digital sensing device 3 may be configured to determine whether alarms are false positives or false negatives, while providing to upper layers of the integrated circuit device incorporating the protected circuit an interpretation of the detected perturbation attack (classification of the perturbation).

The multiplicity of the sensors, coupled with some sensor properties such as sensitivity and persistence, allows feeding the analysis unit 31 of the digital sensing device 3 with rich information. This information allows for increased confidence in false positive versus false negative discrimination and injection characterization.

In some embodiments, the digital sensing device 3 may be used to determine whether alarms are false or true positives. In some embodiments, the digital sensing device 3 may be configured to discriminate between true and false alarms based on predefined thresholds. For example, considering a threshold $i_{th}$ ($1 \leq i_{th} \leq n$), if the bit outputs are such that in normal state $O_1 = O_2 32 \ldots = O_i$, which is the complemented value of $O_{i+1} = \ldots = O_n$, then:

a true positive is detected if $i \leq i_{th}$, a false positive is detected otherwise.

The threshold $i_{th}$ may be selected or predefined according to various criteria. Alternatively, the digital sensing device 3 (more specifically the analysis unit 31) may comprise a classifier based on Machine Learning (ML) to determine whether alarms are false or true positives. In such ML based classification approach, the classifier (also referred to as 'classification unit') may comprise a training engine configured to build a model during a training period (enrolment phase including determination of the laws, and/or models, and/or threshold as example). The classification unit may further comprise a testing block configured to test the model against real data. The classification unit may implement different types of Machine Learning (ML) algorithms such as SVM (Support Vector Machines), RF (Random Forests), Bayes, Rotation Forest (RTF), the Multiboost algorithm, or the clustering algorithm. In particular, a SVM algorithm is binary in the way it operates, but it can be extended to more than two classes.

The classification performed by the classifier of the analysis unit 31 may be 'binary' in that it enables to differentiate between two situations, namely a "benign" situation (no attack is being performed) and an "abnormal" situation (where an attack is being performed).

Machine Learning advantageously allows refined learning methods that greatly improve the attack detection rate while not compromising the false positive detection rate. Specific learning methods can be tailored in the case of perturbation attacks detection in the embedded devices context.

Learning methods may comprise two learning phases: a first learning phase which is performed offline and a second learning phase which is performed online when the target circuit 1 undergoes one or more attacks.

The first learning phase enables building an attack classification model (also referred to as an 'attack model' or a 'classification model') which takes into account both benign and malicious environment conditions. This first phase may comprise three steps. A first step is implemented to learn the benign dispersion behaviors on several chips without user interference. The technological dispersion is accordingly learned to determine how the sensor results/outputs vary from chip to chip.

In a second step, the reaction of the digital sensors 300, in different chosen operational conditionals, is learnt (such as at rest, while executing sensitive operation, while rebooting, while go-to sleep mode, or while executing performance adjustment(s) using Dynamic Voltage and Frequency Scaling (DVFS), etc.).

A third step is then implemented to learn on a single chip over time (e.g. over a predefined learning time interval). In one embodiment, during the third step, for a given chip, the irreversible and passively undergone dispersion over time may be learnt to determine how the results of sensors vary during the "life" of the chip (including the variability of the executed software, the change of user data, and at the hardware level, the wearout of the physical characteristics, also known as "aging", including defect and/or damage of sensors).

Based on the three learning steps of the first phase, the natural variability of the digital sensors 300 may be learned. This variability can be 'benign', meaning that it shall not be interpreted as an attack. Otherwise, it would constitute a false positive.

The second learning phase may be performed under attacks. This allows detecting the abnormal behaviors (interpreted as attacks). By performing the two phases of the learning method, the false positive variations due to chip to chip variability or to the operational conditions that depend on the applicative context and aging can be decorrelated from the unexpected variability due to perturbation attacks.

The second learning phase can be done under different attack conditions. In order to cover as widely as possible the uncountable set of attack parameters, a core-set of environmental perturbations may be preferably chosen. For instance, amongst all the parameters an attacker can tune, a stress can be chosen so as to explore the largest possible range (minimal to maximal values).

A core-set learning consists in choosing a set of points such that a model learned over a selected subset is competitive for the remaining data points of the model. This allows, during the classification step, both detecting an attack and identifying it amongst different classes of attacks. This identification is of great importance as it may allow the manufacturer to establish the power of the potential attacker. For example, a global attack is less likely to succeed than a focused (or local) attack, since only one sensor can detect a global attack whereas local attack can strike between sensors. Moreover, the information gathered about the class of attack makes it possible to characterize and better understand the attacker and its methodology, which gives an opportunity to adapt the defense strategy to the observed attack patterns and associated attack environment. For instance, the reaction can be selected to be: defensive, deceptive, adaptive, or offensive. This may be achieved with a multiclass classification.

The models learnt from data collected in the first and second learning phases are advantageously independent. Therefore, it is possible to merge the models learnt during these two phases into one model in order to build a specific learning method such as one-class classification.

A 'one-class ML classification' refers to an algorithm that learns a decision function for novelty detection, that is for classifying new data as similar or different to the training data/sequence.

Advantageously, the first and second phase of learning may be used during the classification step to subtract the versatility due to the natural non-malicious/benign dispersion model learnt from the three steps of the first phase and the dispersion caused by the different types of attacks considered during the second learning phase.

Further, the use of ML allows exploiting other sources of digital information. The sensing unit 30 may accordingly comprise additional heterogeneous sensors configured to generate data by monitoring different physical parameters and/or software activities such as:

software sensors configured to monitor the activities of the system processor (CPU) or some given peripherals of the integrated circuit 1, sensors configured to monitor congestion on the system bus, sensors configured to monitor the hardware performance counters, the watchdogs and timers, and sensors configured to monitor a software stack in order to detect buffer overflow attacks.

In addition to the digital sensors 300, the additional sensors that can be used include any sensors configured to measure environmental physical parameters such as temperature and pressure. An additional sensor may be a digital sensor configured to monitor and digitally measure the health test performed by a true random number generator (TRNG) or to monitor the reliability estimation hardware/software performed by physically unclonable functions (PUFs). Advantageously, these heterogeneous actuators/sensors can be aggregated so that their joint measurement provides a multimodal measurement.

The use of multiple homogeneous or heterogeneous sensors allows refining the learning and classification methods by enabling the detection and selection the sensors, within one device, that have the lowest variability, which enables to enhance the attack detection. It is an advantage of the invention to perform measurement dimensionality reduction guided by ML.

The ML approach allows remotely monitoring the behaviors of the target circuit 1 and acquiring relevant information during its life cycle. For example, in addition to permitting classification of environment as benign or malicious, the sensors may also upload their measurements to a remote uplink server which may refine the model. For example, if an attack is perpetrated without being noticed, the remote uplink server may tune the decision model so as to capture such attack in the subsequent similar attacks.

Figure 4:
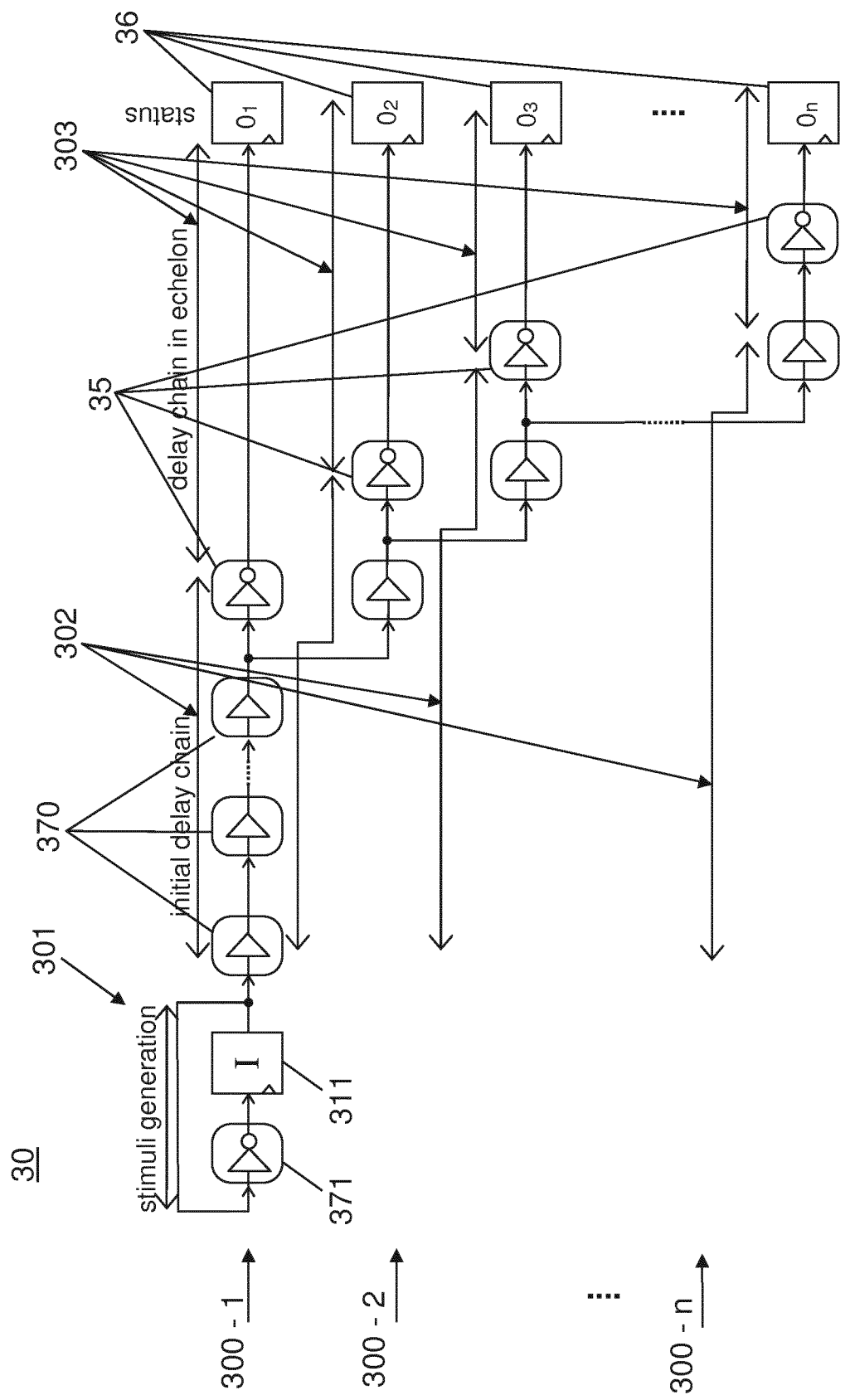
FIG. 4 is a diagrammatic view of a sensing unit having an echelon structure, according to one embodiment.

FIG. 4 represents a sensing unit 30 having an echelon structure, according to one embodiment.

In such embodiment, the sensing unit 30 comprises a set of binary digital sensors 300. In the embodiment of FIG. 4, the sensing unit 30 is configured to deliver a set of digitized sensing outputs $O_i$ having a binary value, the i-th sensing output $O_i$ being derived from the output of the i-th sensor 300-$i$. Each sensing output $O_i$ delivered by the sensing unit 30 may be stored extemporaneously in an output memory element 36 such as a register. In the example of FIG. 4, the register 36 is a Data Flip Flop (DFF).

The output of the sensing unit 30 may comprise at least one multi-bit output having a set of bit components selected among the bit outputs $O_i$.

Each sensor 300 of the sensing unit 30 of FIG. 3 may be implemented in the form of a digital circuit comprising:
- an input memory block 301 for storing input data;
- a first data path 302 for propagating the input data and forming a first delay chain;
- a second data path 303 for propagating the input data and forming a second delay chain.

The input memory block 301 may comprise an input memory element 311 for storing an input data generated using a stimuli generator, such as a Data Flip Flop (DFF).

The initial delay chain 302 may be configured to propagate data from the input memory element 311 to the buffer element 35 which buffers the data propagated through the initial delay chain 302.

The data path 303 (forming a delay chain in echelon) may propagate the value bit from the element 35 to the corresponding sensor output memory element 36.

The input memory block 301 and the second path 302 may further comprise combinatorial standard cells 370, 371. The combinatorial standard cells 370, 371 may be configured to determine the value to be stored in the output memory elements 36, using as input values the signals stored in the input memory element 311. Combinatorial standard cells may include memory less logic gates that may implement Boolean functions such as an inverter gate 371, other combinatorial standard cells which include buffers whose function is to amplify and/or delay a data path such as buffer 370 used in the example illustrated in FIG. 4.

The input memory block may be configured to generate stimuli. The memory element 311 of the input memory block 301 may be any element configured to change the sensor state at each clock cycle, such as an input DFF, using a sampling of the inverse value provided by the invertor gate 371.

This has the effect to generate a string of 010101 ..., which endlessly stimulates the sensor at each clock cycle. As a result, a new fresh measurement is possible at each clock cycle. This makes the sensor continuously sensing.

In the following description of some embodiment, an input memory block 301 of DFF type will be considered that stores a value I, for illustration purpose.

A computation is deemed successful if the data correctly arrives from the input memory element 311 to the output memory element 36 in time for being sampled, that is to say within less than a clock cycle.

The quantitative digital sensing device 3 may be used to detect abnormal operating conditions of the target circuit.

The quantitative digital sensing device 3 may be advantageously built with the same logic elements than other digital circuits so that it is sensitive to out-of-specifications operating conditions such as temperature, voltage, clock frequency, etc. For example, if the temperature increases above a given threshold, the propagation delays of the combinatorial gates of the quantitative digital sensor data paths 302 will increase to the point where the data reaches the output memory element 36 after the clock rising edge, thereby causing a setup violation fault. This late arrival may induce a faulty state in the output memory element 36 with respect to the reference signal. This faulty state can be detected by comparison of the set of values $O_i$ in the output memory element 36 and can be used by the analysis unit 31 to generate an alarm.

In the embodiment of FIG. 4, each i-th sensor 300-$i$ comprises the inputs elements 301, the initial delay chain 302, the delay chain in echelon 303 and the sensor output memory element 36 storing $O_i$. With such echelon structure, a perturbation will create a strong change in the critical path 303, thereby involving by a significant change of the status bits with respect to the nominal and perturbation-free operation. Accordingly, a false positive may fault only a few paths, whereas a true positive may fault more paths.

In the prior art, to protect the target digital circuit 1 from attacks, the digital sensors trigger an alarm based on an alarm threshold selected arbitrarily in broad intervals and without study of the measurements variations in time. Accordingly, the target digital circuit 1 operates with a much lower clock frequency than what it is really capable of handling, which results in low circuit performances. This enables minimizing false positives to occur, at the expense of performance. False positives consist in the detection of an alarm although there is no risk for the circuit. Such event might cause countermeasures to be activated (e.g., reboot of the circuit), which degrades the user experience.

By using a combination of output values $O_i$ delivered by the sensors 300, to detect abnormal operating conditions of the target circuit, the quantitative digital sensing device 3 is able to operate with a higher clock frequency, thereby improving the circuit performances. Further, the quantitative digital circuit is capable of detecting an attack even before the stress has actually caused a malfunction. Indeed, the output memory elements 36 used to store the output vector V (or more generally the output memory 4) will have their physical characteristics fluctuate during an evaluation corresponding to an identification phase, due to attack test tool calibration and methodical chip scanning. Hence attack preparation stage can already be detected according to embodiments of the invention.

To detect abnormal operating condition, the digital sensing device 3 according to the embodiments of FIGS. 3 and 4 may be designed such that there is at least one critical path (longest path) starting from the input DFF I (respectively I') of the sensor 300 to one of the DFF $O_i$ (respectively $O'_i$), and that:
(1) All paths in the digital sensor 3 are shorter in time than the critical path;
(2) The critical path is compatible with a nominal environment (clock period, power supply, etc.).

Figure 5:
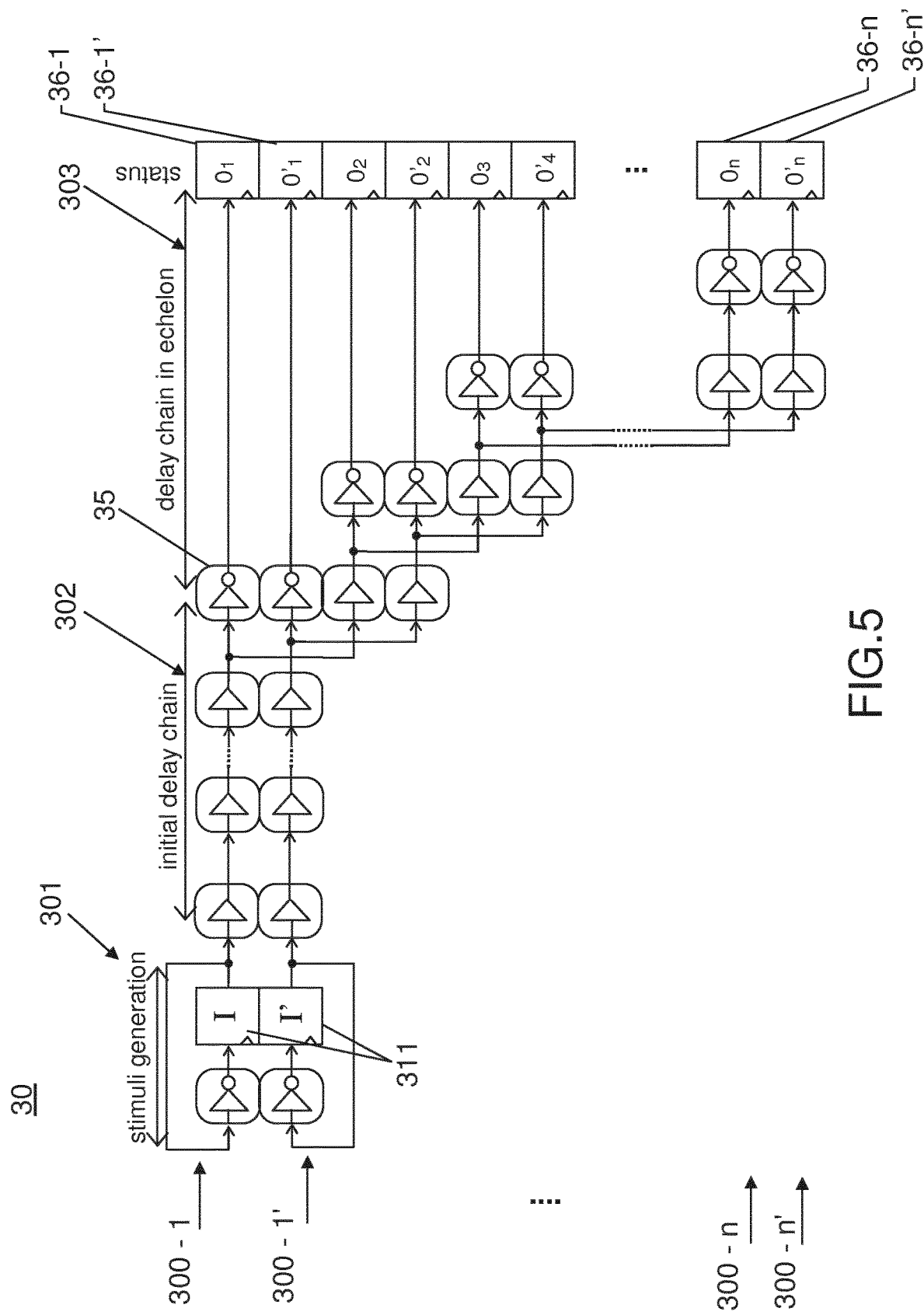
FIG. 5 depicts a dual multi-bit sensing unit configured to deliver a set of sensing outputs, according to another embodiment.

FIG. 5 depicts a dual multi-bit sensing unit 30 configured to deliver a set of n sensing outputs $\{O_1, \ldots, O_i, \ldots, O_n\}$ according to one embodiment. In such embodiment, the analysis unit 31 may comprise a classifier 310 (shown in FIG. 2) configured to classify a detected perturbation attack which induces a fault. In one embodiment for example, the classifier may be configured to determine whether a detected fault is:
- local (i.e. related to a dedicated part of the chip), such as a focused laser fault injection, or
- global (i.e. concerns the chip in general), such as in power/clock glitch or EM impulse attacks.

A laser attack can for example target a few transistors and is therefore selective. In particular, it might strike logic which is far from a sensor 300. As a result, a sensor 300 might be bypassed, even if indirect effects of the local laser shot might propagate far within the chip. Therefore, such attack and fast reaction may be required when a local laser perturbation attack is detected to prevent a critical threat on the security of chip. In contrast, some categories of attacks are more widespread. Those are likely to be caught by at least one sensor. Therefore, those attacks do not require as fast reaction to trigger appropriate action.

In such embodiments, the sensing unit 30 may comprise at least a tuple of quantitative sensors. Each tuple of sensors may comprise a reference sensor 300 and one or more redundant sensors.

In a particular embodiment, the sensing unit 30 may comprise at least one pair of quantitative sensors 300-$i$ and 300-$i'$ (a pair of sensors will be hereinafter generally referred to as {300, 300'}). The reference and redundant sensors may be identical or similar. The following description of some embodiments will be made with reference to a sensing unit comprising at least one pair of reference sensors.

In the exemplary embodiment of FIG. 5, a pair of two sensors 300 and 300' is used. Each pair of sensors {300, 300'} comprises a reference sensor 300 and a redundant sensor 300' (references with primes relate to the redundant sensor of a sensor pair). In the sensing unit 30, the reference sensors 300 (each reference sensor corresponding to a "reference" echelon structure) and the redundant sensors 300' (each redundant sensor corresponding to a "redundant" echelon structure) are further placed interleaved (in other words, a redundant sensor 300' is arranged physically between two reference sensors in the sensing unit 30).

The analysis unit 31 may be configured to compare the first output vector $V=[O_1 \ldots O_i \ldots O_n]$ (also referred to as a "reference vector") of the reference sensor 300 of each pair with the second output vector $V'=[O'_1 \ldots O'_i \ldots O'_n]$ (also referred to as a "redundant vector") of the redundant sensor 300' of the same pair. The classifier 310 may then classify the perturbation based on the result of statistical tests, for example based on the result of the comparison between the two vectors. Such classifier can advantageously implement a machine learning algorithm configured to be trained and to perform classification.

The sensing unit 30 may further deliver a first vector V comprising the bit outputs of the reference sensors 300 and a second vector V' comprising the bit outputs of the redundant sensors 300', the analysis unit 31 being configured to classify a detected perturbation attack from a comparison between the first vector V and the second vector V'.

In one embodiment, the analysis unit 31 may be configured to determine that a perturbation occurred and is local if for a predefined number of pairs of sensors {300, 300'} of the set of sensors, the output vectors of the reference sensor 300 of each pair of sensors and the output vector of the redundant sensor 300' of the same pair have different status bits $O_i$ and $O'_i$ (such condition on the output vectors of the reference sensor and of the redundant sensor is also referred to hereinafter as a 'status bit condition'). In particular, the analysis unit 31 may be configured to determine that a perturbation occurred and is local if the status bit condition is satisfied for all the pairs of sensors {300, 300'} of the set of sensors. If the attack is determined to be local, the attack can more alter one echelon structure than the other (for example the redundant echelon structure may be more altered than the reference echelon structure or vice versa). Otherwise, if the sensors evolve but track over time (that is if the sensors change while at each time instant, for all i between 1 and n, the equality condition $O_i=O'_i$ is satisfied), the analysis unit 31 may detect that an attack with global effects is being perpetrated. It should be noted that the analysis unit 31 may be adapted to determine also that a perturbation is both global and local (the two diagnoses may be complement). An attack which is both global and local reaches an important number of sensors (the number may be at least equal to three) while having a stress that is not uniformly distributed.

In another embodiment, the analysis unit 31 can determine whether the attack is local by not only comparing the reference vector V and the redundant vector V', but also further checking the variations over the time of the status bits $O_i$.

A local attack may be detected when the two status words V and V' suddenly and strongly differ. As used herein, two status words V and V' are considered as "suddenly" differing if the successive values in time of the two status words differ with respect to each other in Hamming distance of a value strictly greater than one, that is if the two successive values have at least two different bits (such condition will be referred to hereinafter as the 'Hamming distance condition').

The analysis unit 31 may comprise a comparator configured to compare the status words and/or the status bits. To enable the comparison, the analysis unit 31 may be configured to sample the sensor output bits of the status words V and V' (vectors $V=(O_1, \ldots, O_n)$ and $V=(O'_1, \ldots, O'_n)$) at several times, for example using an output memory 4 configured to store the successive values in time of each output bit $O_i/O'_i$ resulting from the sampling. The data structure may be for example a shift register, a FIFO (First-In First-Out), or a LIFO (Last-In First-Out).

Figure 6:
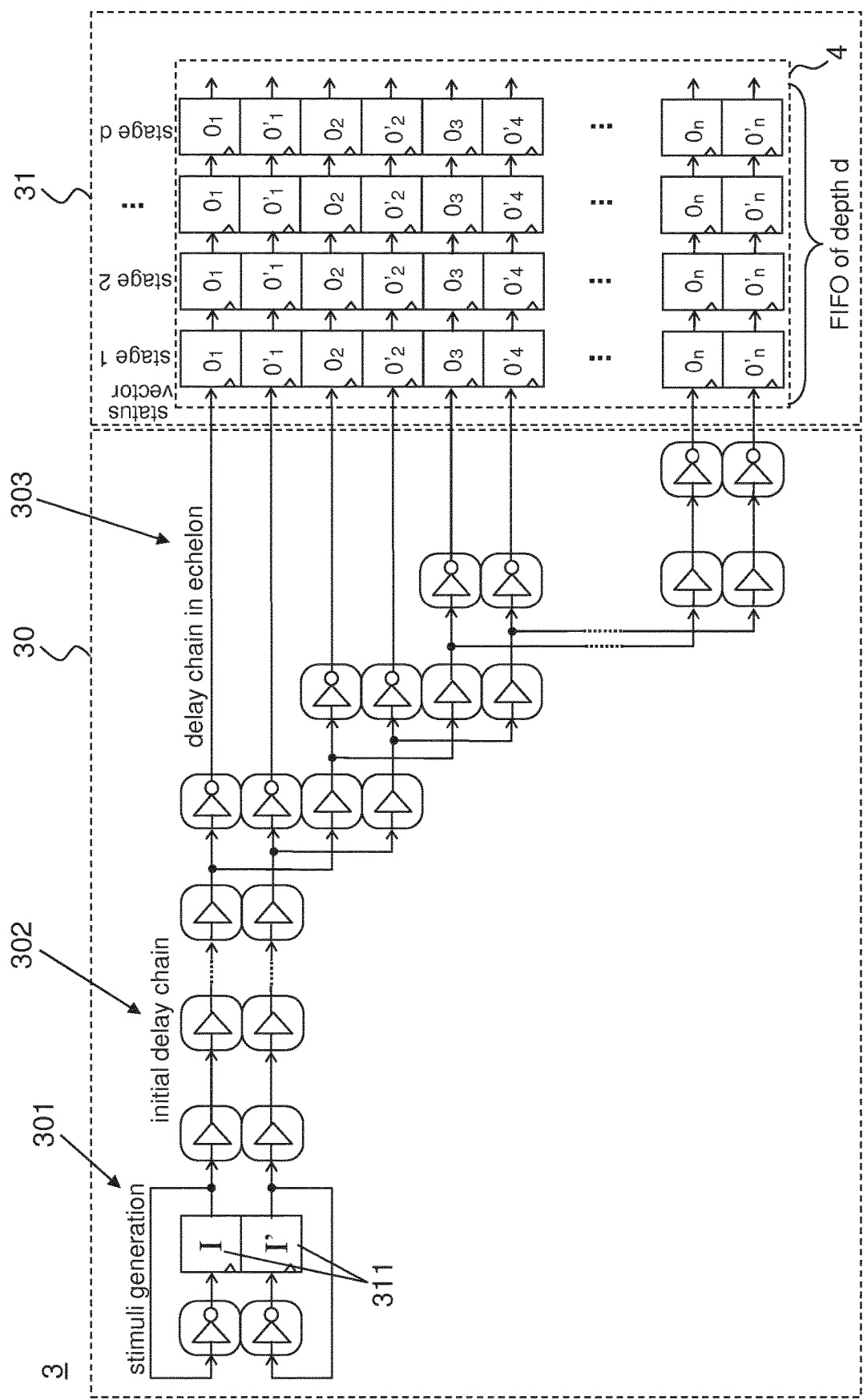
FIG. 6 depicts a dual multi-bit sensing unit comprising a register data structure, according to one embodiment.

FIG. 6 shows a partial view of a qualitative digital sensing device 3 (the comparator is not shown) comprising a FIFO of depth d, for storing the d successive values in time of each output bit $O_i/O'_i$ (d sampling values for each output bit $O_i$). The comparator may use the successive values of each status word over the time to detect and/or classify an attack.

FIG. 7 shows the variation of each output bit $O_i/O'_i$ in time, in the form of a waveform, in response to an input I varying from 0 to 1 applied to the sensors 300. FIG. 7 thus represents an example of the history of the quantitative digital sensing device 3 over the time. The part of the comparator 42 configured to check the Hamming distance condition (difference strictly greater than one (1)) can be advantageously implemented in hardware, for a faster response. As shown in FIG. 7, the separation line between the values at '0 . . . 0' and the value at '1 1 . . . 1' fluctuates in time, that is the frontier between the series of zeros and of ones is not always at the same index j (1≤j≤n) of the output bits $O_j$.

Figure 8:
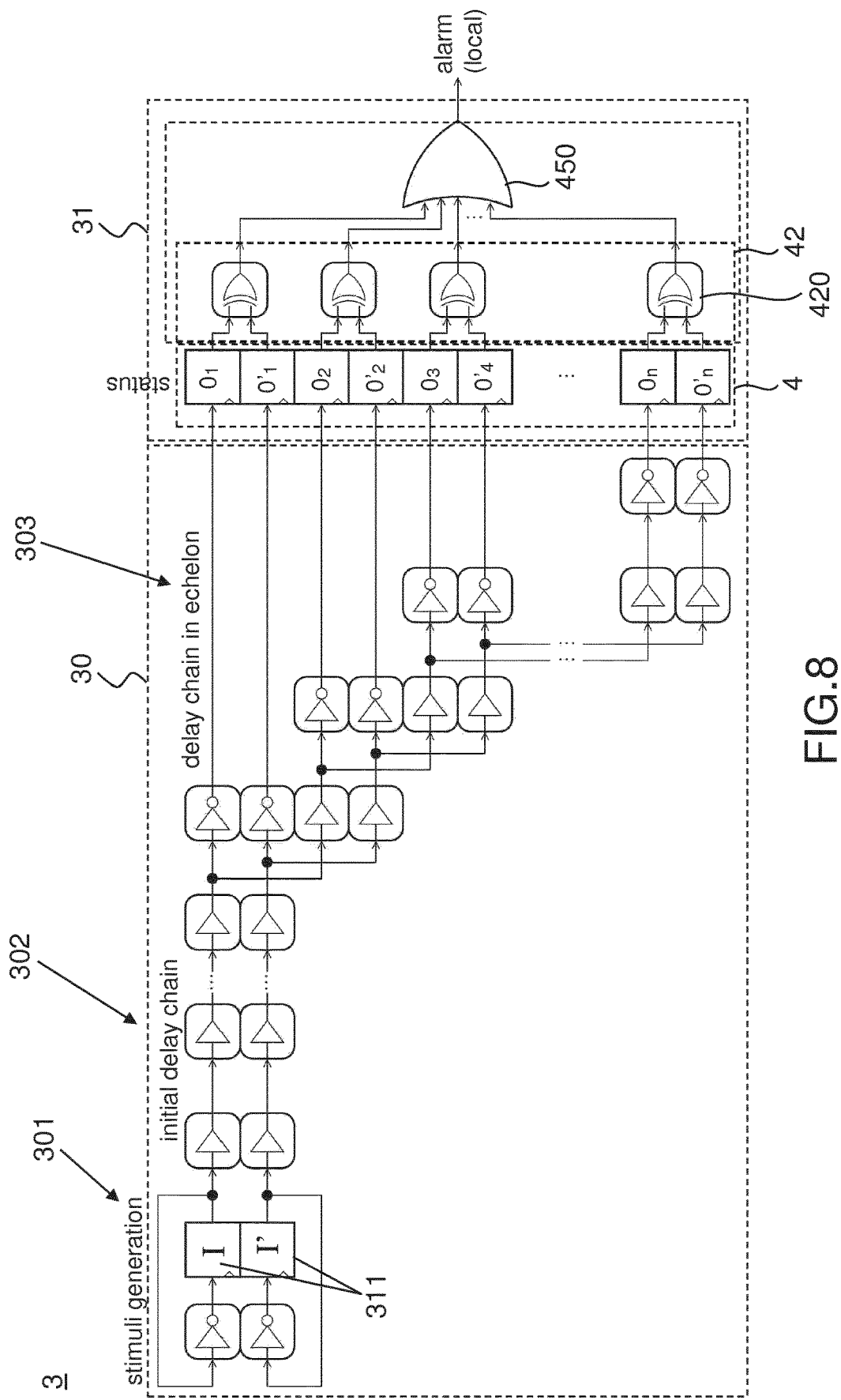
FIG. 8 depicts a dual multi-bit sensing unit configured to detect signal faults occurred locally, according to one embodiment.

FIG. 8 shows a quantitative digital sensor 3 comprising a comparator 42. The comparator 42 may be implemented using a set of elementary comparators 420. Each elementary comparator 420 may be configured to compare at a given instant time the value of each i-th output bit $O_i$ of the reference sensor 300 with the value of i-th output bit $O'_i$ of the redundant sensor 300'. In one embodiment, the comparator 42 may comprise as many elementary comparators as the number n of output bits delivered by each sensor 300 or 300'. In one embodiment, each elementary comparator 420 may be implemented as an exclusive OR (XOR), the i-th elementary comparator 420 implemented as a XOR receiving as inputs value of each i-th output bit $O_i$ of the reference sensor 300 with the value of i-th output bit $O'_i$, the output of the elementary comparator being thus equal to 0 if the output bit $O_i$ of the reference sensor 300 is equal to the value of i-th output bit $O'_i$, and equal to 1 if the output bit $O_i$ of the reference sensor 300 is different from the value of i-th output bit $O'_i$ (as defined by the truth table of a XOR). The outputs of the set of elementary comparators 420 may be then inputted to a logical OR 450 provided in the analysis unit 31, the output of the OR 450 being equal to 1 if at least one output of the set of elementary comparators 420 is equal to 1; that is, if for at least an index i (i=1 to n), the output bit $O_i$ of the reference sensor 300 differs from to the value of i-th output bit $O'_i$. In such case a local attack may be detected. The analysis unit 31 may be configured to trigger an alarm if such a local attack is detected (output of the OR operator 450 is equal to 1).

Figure 9:
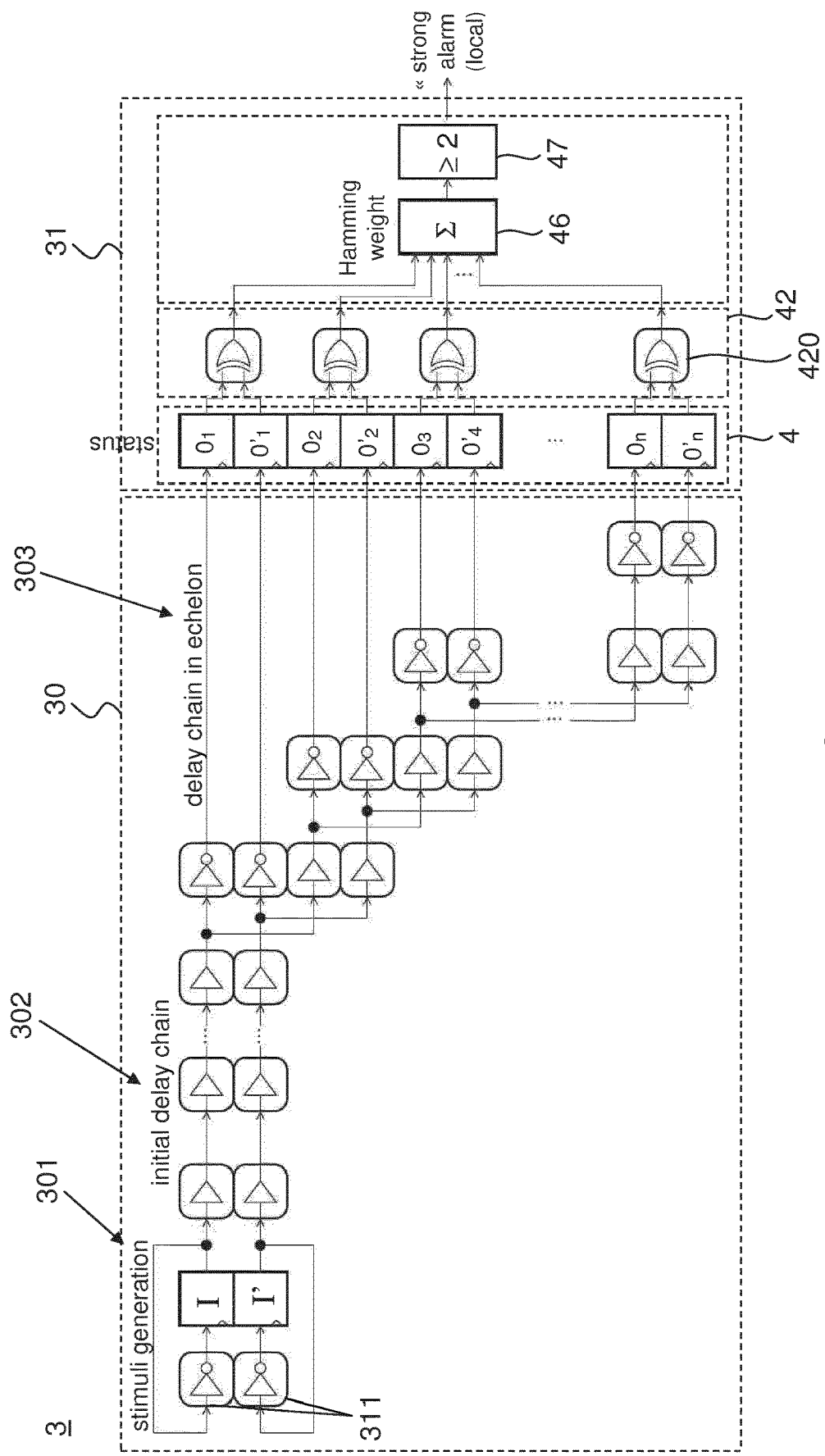
FIG. 9 depicts a dual multi-bit sensing unit configured to detect signal faults occurred locally with high priority, according to another embodiment.

FIG. 9 shows a quantitative digital sensing device 3 comprising a comparator 42, according to another embodiment. In such embodiment, the comparator 42 of the analysis unit 41 may detect that the two status words V and V' are considered as "strongly" differing if there is a Hamming weight between V and V', at the same time, which is strictly greater than one ('>1'). The Hamming distance between the two words V and V' can be seen as the Hamming weight of V-V'. As V and V' are binary strings, the Hamming distance is equal to the number of ones ('1') in V XOR V'.

In the embodiment of FIG. 9, the comparator 42 is also implemented using the set of elementary comparators 420 each implemented as a XOR, as described in connection to FIG. 8. The outputs of the set of elementary comparators 420 may be then provided as inputs to a sum operator 46 noted '$\Sigma$' configured to determine the Hamming weight between V and V'. The Hamming distance between V and V' is also denoted as $d_h(V, V')$ and is equal to $w_h(V \text{ XOR } V')$, with:

$$w_h(V X O R V')=\Sigma_{i=1}^{i=n}(O X O R O'_i)$$

The output of block 46 is then provided as input to a weight comparator 47 configured to determine if the received input, that is the hamming distance is strictly greater than one ('>1') (i.e. superior or equal to 2 ('2')). If so, the status words V and V' are "strongly" differing and the analysis unit 31 may trigger an alarm if such a local attack is detected (output of the comparator 47 is superior or equal to 2).

Figure 10:
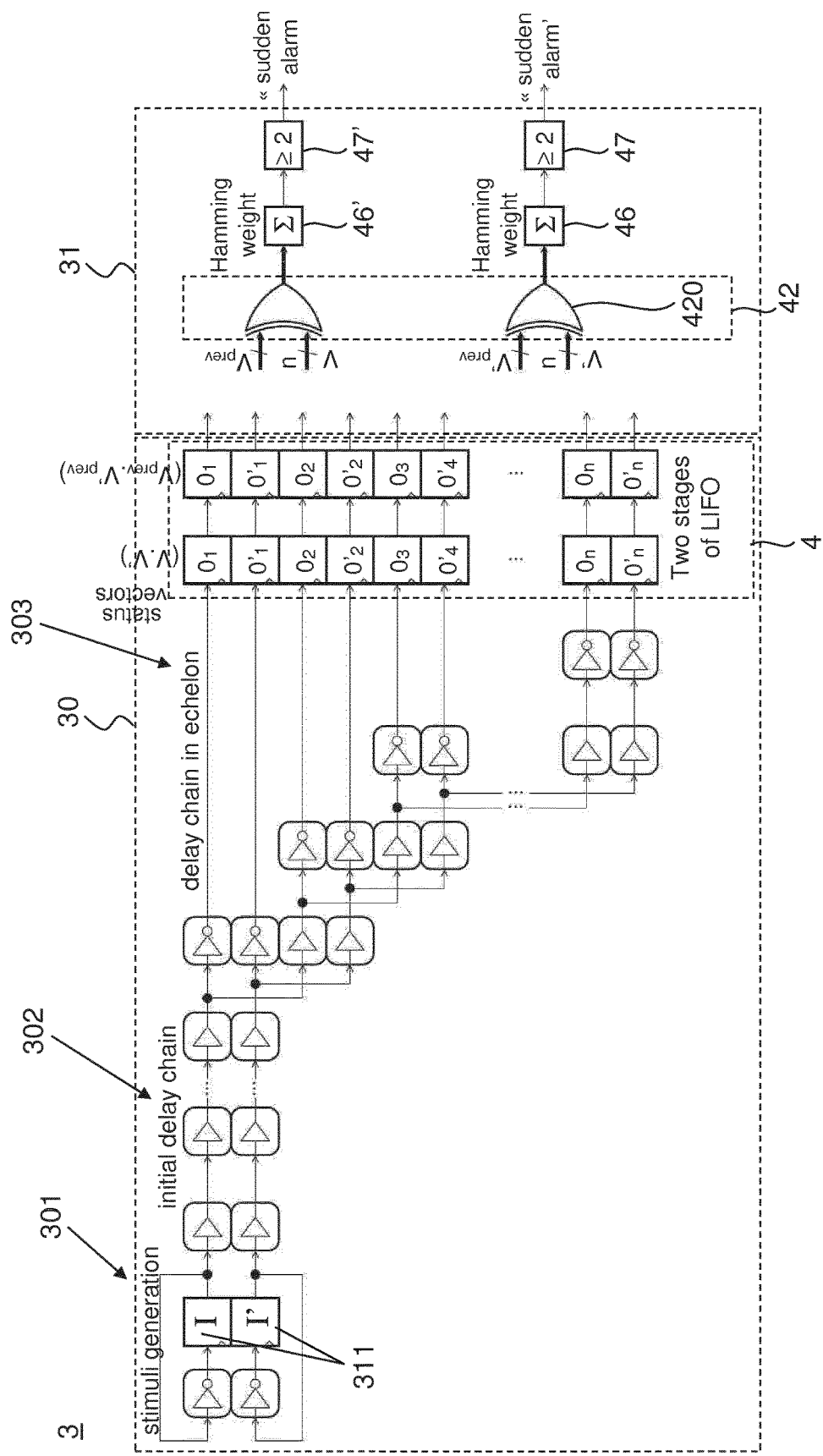
FIG. 10 depicts a dual multi-bit sensing unit configured to detect attacks which change the status of bits suddenly, according to still another embodiment.

FIG. 10 depicts an exemplary quantitative sensing device 3 configured to implement such Hamming distance condition, that is detect if the two status words V or V' are "suddenly" differing, according to an embodiment. FIG. 10 differs from FIG. 9 in that the comparator 42 comprises two XOR 421 and 421' configured to compare two different states in time of the each binary vector V or V'. More specifically, in the embodiment of FIG. 10, the comparator 42 comprises a first XOR 421 and a second XOR 421', the first XOR being configured to perform a XOR of:

a first input $V_{prev}$ corresponding a previous state in time of the first binary vector $V=(O_1, \ldots, O_n)$ (reference vector), that is at a time instant $t_0$, and a second input V corresponding a subsequent state in time of the second binary vector $V=(O_1, \ldots, O_n)$ (reference vector), that is at a time instant $t_1 < t_0$.

A block 46 may be provided to receive the output of the first XOR 421 to determine the Hamming weight, the Hamming weight thus determined being input to a weight comparator 47 to determine if the hamming weight is strictly greater than one ('>1') (i.e. superior or equal to 2 ('2')). If so, the two states of the status word V at times $t_0$ and $t_1$ are considered as "suddenly" differing and the analysis unit 31 may trigger an alarm if such sudden difference is detected.

Similarly, the comparator 42 may comprise a second XOR 421' configured to perform a XOR of:

a first input $V'_{prev}$ corresponding a previous state in time of the second binary vector $V'=(O_1, \ldots, O_n)$ (redundant vector), that is at the time instant $t_0$, and a second input V' corresponding to a subsequent state in time of the second binary vector $V'=(O'_1, \ldots, O'_n)$ that is at the time instant $t_1 > t_0$.

The analysis unit may comprise a block 46' configured to receive the output of second XOR 421' to determine the Hamming weight, the Hamming weight thus determined being input to a weight comparator 47' to check if the hamming weight is strictly greater than one ('>1') (i.e. superior or equal to 2 ('≥2')). If so, the two states of the second binary vector V at times $t_0$ and $t_1$ are considered as "suddenly" differing and the analysis unit 31 may trigger an alarm if such sudden difference is detected.

In another embodiment, the analysis unit 31 may be configured to detect local attacks based on the bit patterns of the status bits $O_i$. More specifically, the analysis unit 31 may be configured to control if the status bits $O_i$ are monotonous, that is if for an input I varying from 0 to 1:

$$0 \le O_1 \le O_2 \ldots \le O_{n-1} \le O_n \text{ or } O_1 \ge O_2 \ldots \ge O_{n-1} \ge O_n,$$

when the nominal values of the status bits (the nominal value of a status bit is the value of the status bit in the absence of an attack) are:

$$O_1=O_2 \ldots =O_{th}=1 \text{ and } O_{th+1}=O_{th+2} \ldots =O_n=\text{not} \quad (I),$$

If the analysis unit 31 detects that the status bits $O_i$ are not monotonous, the analysis units determines that the likelihood that an attack is being performed on the circuit is high. It is indeed highly likely that an attacker is flipping one or few status flip-flops 36 as a side-effect of his attack, with a precise injection tool, like a laser. In addition, the analysis unit 31 may be configured to compare the status words V and V' of the two interleaved sensors 300 and 300'.

In another embodiment, the analysis unit 31 may be configured to correlate the status bits $O_i$ from multiple sensors for example to measure the aging level of the circuit 1, and/or to use this information for the computation of the threat level (e.g., low, medium, high). It should be noted that the more the circuit 1 ages, the more an attacker will potentially have developed expertise, so that the threat level should be increased to take into account the attack increase in terms of knowledge of the target.

In one particular embodiment, the analysis unit 31 may be configured to measure the aging of the protected circuit 1 from the outputs $O_i$ delivered by the set of sensors 300. Aging is related to the time a circuit has been first powered on and duration and/or frequency of use phases. In such embodiment, the analysis unit 31 may comprise a PUF (Physical Unclonable Function) structure, such as a SRAM-PUF (SRAM is the acronym of "Static Random-Access Memory") to measure aging of the circuit 1, the aging of the circuit 1 being measured as a variation of the reliability of some PUF (Physical Unclonable Function) structure. The reliability of the PUF can thus be used as a sensor for the aging of the circuit. Therefore, the SRAM-PUF reliability can be seen as a non-forgeable quantitative digital sensor 3 for the total duration of use of the circuit 1, the set of bit outputs $B_c$ of the SRAM-PUF corresponding to the outputs $O_i$ of the digital sensor.

In such embodiment, the sensing unit 30 may comprise at least two sensors 300 implemented in the form of a SRAM-PUF, which delivers SRAM bits in response to an input, each SRAM bit outputted by the SRAM bits forming a bit output $O_i$.

Figure 11:
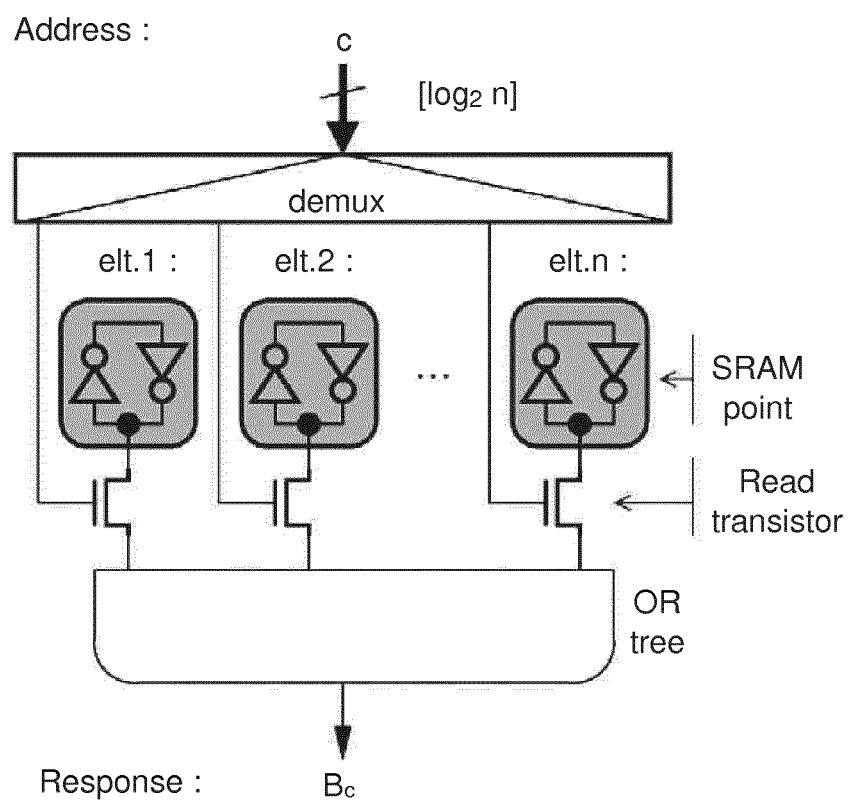
FIG. 11 depicts a sensing device configured to determine aging of the circuit, according to an embodiment.

FIG. 11 shows a detailed view of a SRAM-PUF.

A Static Random-Access Memory (SRAM)-based PUF uses a SRAM as a PUF source. It may further comprise a fuzzy (key) extractor (not shown) configured to derive a stable unique key from the SRAM PUF.

A SRAM-PUF is a Memory-based Intrinsic PUFs (also referred to as "memory PUF") which is based on the settling state of SRAM memory elements. A SRAM-PUF is associated with a limited number of different challenges. Further, the memory addresses can be used as challenges. The response Bc of the SRAM-PUF depends on the input c. Many independent values of Bc can be obtained by scanning through all values of c.

A Static Random Access Memory (SRAM) can retain the information it stored as long as power is supplied. The term "random access" means that in an array of SRAM cells, each cell can be read or written in any order, no matter which cell was last accessed.

A SRAM cell has a symmetrical structure and comprises a set of transistors (such as MOSFETs). An exemplary of a SRAM is a 6T-SRAM using six transistors per bit. Other types of SRAM chips can use 4, 8, 10 (4T, 8T, 10T SRAM), or more transistors per bit.

Each bit in an SRAM is stored on a subset of storage transistors that form two cross-coupled inverters. For example, in a 6T-SRAM, each bit in an SRAM is stored on four transistors (M1, M2, M3, M4) that form two cross-coupled inverters.

Each of these inverters is connected between power supply lines $V_{SS}$ and $V_{DD}$, power supply lines $V_{DD}$ comprising a low positive direct-current voltage and the power supply line $V_{SS}$ comprising a reference potential such as ground.

Two additional access transistors may be used to control the access to a storage transistor during read and write operations.

Some of the storage transistors (M1, M2, M3, M4), for example M1 and M4, function as "pull-down" transistors, while the other storage transistors, for example M2 and M3, function as "pull-up" transistors. The pull-up transistors may be identical P-channel devices and the pull-down transistors may be identical N-channel devices. In FIG. 6, only four transistors are shown M1, M2, M3, and M4.

Access to the cell is enabled by a word line WL which controls the access transistors M5 and M6. The access transistor may control whether the cell should be connected to two bit lines including a bit line BL and an inverse bit line $\overline{BL}$. The two bit lines are used to transfer data for both read and write operations and are controlled by a bit line driver (not shown). During read accesses, the bit lines are actively driven high and low by the inverters in the SRAM cell.

The core of the SRAM cell is thus formed by the two inverters, the output potential of each inverter being fed as input into the other.

In standby mode, the word line WL is low, turning the access transistors OFF. In this state, the inverters are in complementary state.

To write information, the data is imposed on the bit line BL and the inverse data on the inverse bit line $\overline{BL}$. The access transistors may be turned ON by setting the word line WL to high. As the driver of the bit lines is much stronger, it can assert the inverter transistors. As soon as the information is stored in the inverters, the access transistors can be turned OFF and the information in the inverter is preserved.

For reading, the word line WL is turned ON to activate the access transistors while the information is sensed at the bit lines.

In accordance with some embodiments of the invention, the analysis unit 31 may implement an aging method comprising steps for determining the reliability of the SRAM-PUF and compare the reliability thus determined with a reference value corresponding to a non-aged SRAM-PUF, which can be saved for example in a Non-Volatile Memory (NVM). The more aging difference, the more the difference in reliability (the reliability increases in average with the age of the device).

In the abovementioned embodiments, the digital sensors 300 rely on a similar kind of measurement, typically the transduction of some effect to a time delay (i.e., propagation time along a delay chain). Advantageously, in some embodiments, the digital sensors 300 may be configured to transduct to another physical quantity, such as frequency, where a sensor is built as an oscillating structure, typically obtained by looping the delay chain sensor on itself) counting a number of rounds.

Figure 12:
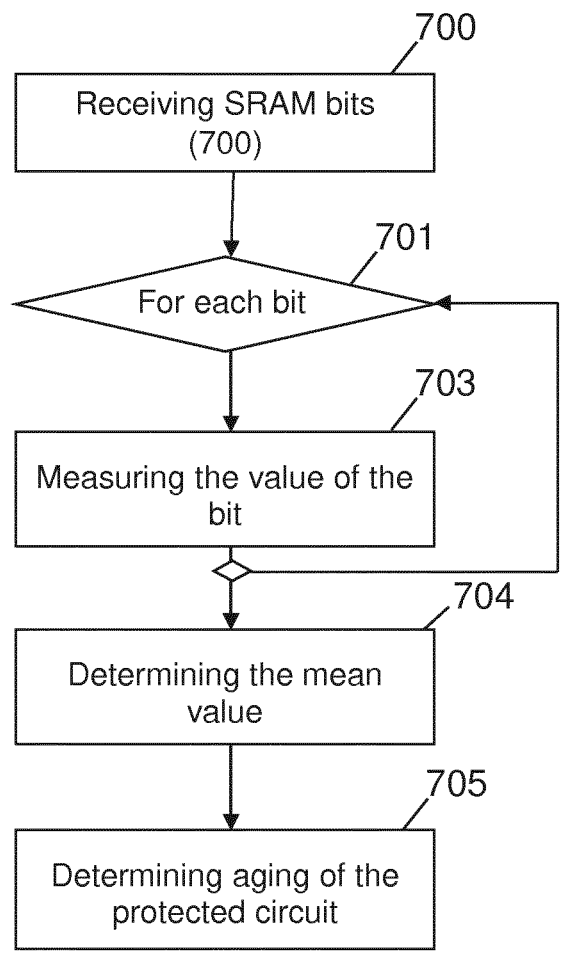
FIG. 12 is a flowchart depicting the process of aging a target circuit using the output of a SRAM-PUF sensor, according to an embodiment.

FIG. 12 is a flowchart depicting the process of aging a target circuit 1 using the output of a SRAM-PUF sensor 300.

In step 700, the SRAM bits are received by the analysis unit 31.

The following steps are repeated for all SRAM bits (lock 701).

More specifically, step 703 is repeated n times (for each iteration in block 701) with n representing the number of SRAM bits.

In step 703, the current iteration consists in measuring the value of the current SRAM bit.

In step 704, a mean value is computed taking into account the n values of the SRAM bits measured in the n iterations of step 703.

The mean value thus obtained represents an estimation of the reliability of the SRAM-PUF, which evolves over time.

In step 705, an estimate of the aging can be performed based on the mean value determined in step 704. This mean value increases with the aging. Aging can thus be inferred by comparing the present estimation of the reliability with a reference value stored in a Non-Volatile Memory. Such reference value may be determined by a learning phase (also known as an enrollment phase).

The SRAM PUF outputs bits (thus forming one or more vectors of bits for memory outputting "words") sense the "aging" of the circuit, after some processing (such as "accumulation" step 704). Thus, the values read out from the PUF (in steps 701 and 703) represent the output of multiple sensors 300.

In some embodiments, the analysis unit 31 may be configured to compute a real-time diagnosis about attacks using the outputs of the sensing unit 30.

The analysis unit 31 may be configured to deliver an output comprising an indication of the detected threat level (e.g. low, medium, high). The output of the analysis unit 31 may have any form such as such as a notification or a dashboard comprising the detected threat level. The output of the analysis unit 31 may be interpreted as a hint whether the observed status change is due to an attack or another reason independent of an attack, such as a power voltage drop.

In some embodiments, the analysis unit 31 may be configured to additionally or alternatively trigger an alarm depending on a detected level of an attack (for example if a high level is detected). Such alarm can be used for instance to trigger a chip reset signal, and/or a freeze of the processor pipeline, and/or a message to the operating system (to sandbox the current process, and/or to log the event). Such alarm can also be used as an input of a classification algorithm based on machine learning, or to trigger auto-destruction of the chip.

It should be noted that in some embodiments, the classifier of the analysis unit 31 may performed particular classification based on machine learning, for example using SVM (Support Vector Machine), or RRF (Rotational Random Forests).

The classification performed by the classifier may be 'binary' in that it enables to differentiate between two situations, namely a "benign" situation (no attack is being performed) and an "abnormal" situation (an attack is being performed).

However, the classification may have more granularity in that it may differentiate between different attack situations such as:

a "benign" situation (no attack is being performed), an "abnormal" situation (an attack is being performed) which can be itself broken down into several sub-classes situations: a "clock glitch", a "reset glitch", a "power glitch", an "electromagnetic fault injection", a "laser shoot injection", etc.

More generally, the classifier may be adapted to classify an attack situation among P classes.

Figure 13:
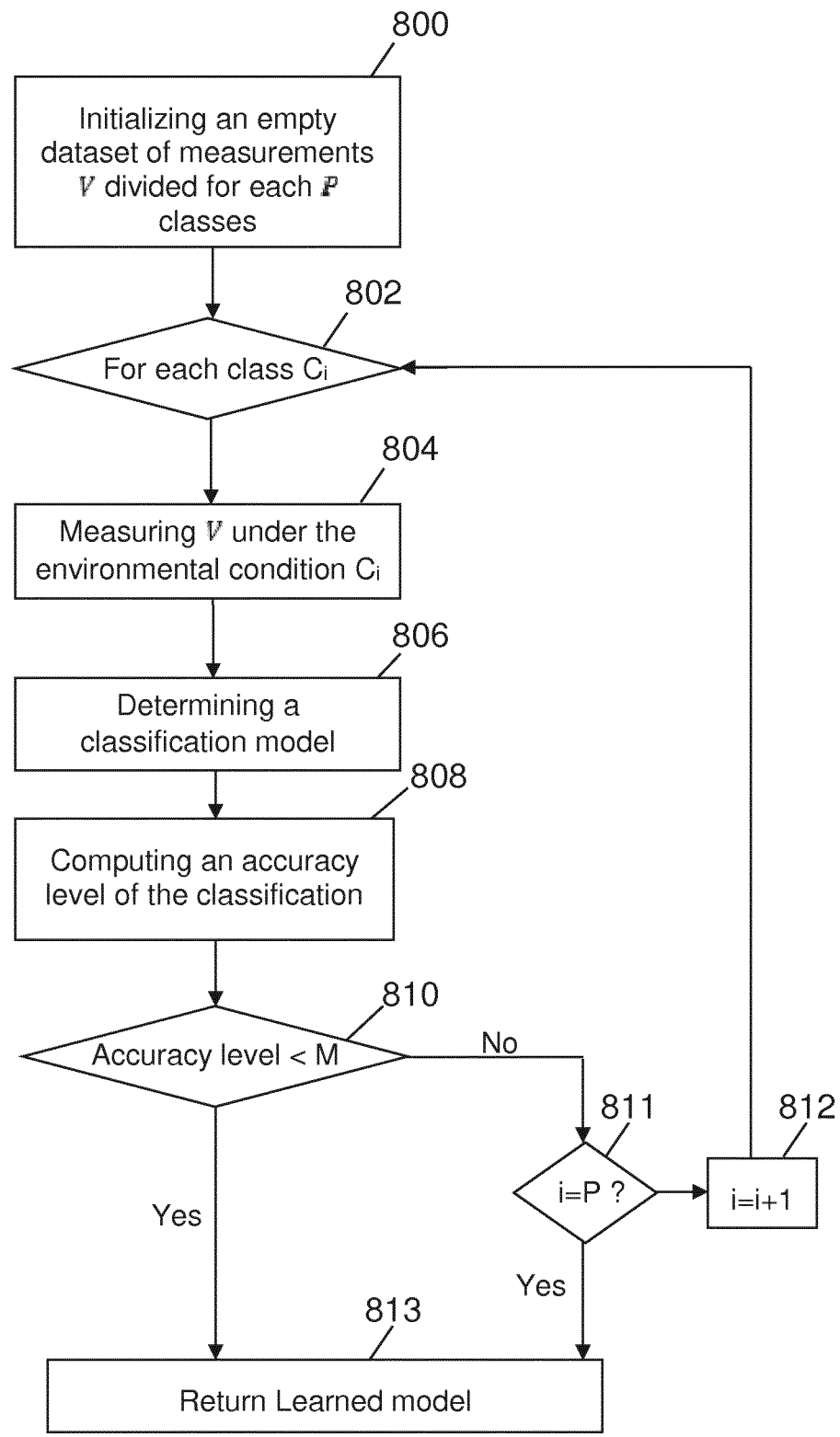
FIG. 13 is a flowchart depicting the learning phase of a classification method according to an embodiment.

FIG. 13 is a flowchart depicting a method of classifying (classification method) an attack among P possible classes ($C_1, C_2, \ldots, Cp$) according to a particular embodiment. FIG. 13 shows the learning phase.

The method may comprise an initial learning phase, which may be performed offline in a protected environment.

The learning phase may comprise a step 800 of initializing an empty dataset of measurements V divided for every P classes.

The following steps are then repeatedly performed (loop) for each class $C_i$. More specifically, for each class $C_i$ in $\{C_1, C_2, \ldots, Cp\}$ (block 802), a measurement of V is taken under the environmental condition $C_i$ in step 804.

In step 806, a classification model is learnt using a suitable classification technique (defined by a classification algorithm).

In step 808, an accuracy level (also referred to as an "accuracy indicator" or "accuracy metric value") of the classification for the learning model may be computed.

In step 810, a condition related to the accuracy level is checked. In one embodiment, as depicted in FIG. 13, step 810 may comprise determining if the accuracy level determined in step 808 is greater than a predefined threshold (the threshold may be for example 99% if the accuracy level is expressed as a percentage).

If the condition is satisfied, the loop may be broken (that is the method does not perform further iterations for the next classes $C_{i+1}$ to Cp). Thus in step 813, the learning phase may be terminated and the method may return to the learned model.

Otherwise, if the condition related to the accuracy level is not satisfied in step 810, next iterations (block 812) are performed for classes $C_{i+1}$ to Cp, until all the classes have been processed (block 811) or until the loop is broken (blocks 811 and 812).

The learning phase thus results in a learned model.

After the learning phase, the classification method may perform a matching phase online.

Figure 14:
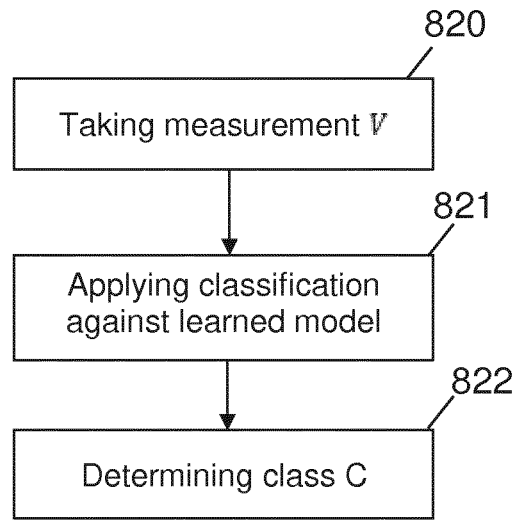
FIG. 14 is a flowchart depicting a method of classifying an attack, according to an embodiment.

FIG. 14 is a flowchart depicting the classification phase of the classification method to classify an attack among P possible classes ($C_1, C_2, \ldots, C_P$) according to an embodiment.

In step 820, a measurement of V may be taken.

In step 821, a classification is applied against the learnt model to determine the class of an attack. In step 822, the class C as determined in step 821 is returned with C belonging to the set of classes $\{C_1, C_2, \ldots, C_P\}$.

The various embodiments of the invention accordingly improves the protection of IC devices 1, such as embedded systems (e.g. smartcards, multimedia players, recorders, mobile storage devices like memory cards and hard discs, etc.) or IC devices implemented in a M2M platform or terminal in IoT architecture (IoT stands for 'Internet of Things'), against perturbation attacks.

Advantageously, the latency in the analysis performed by the digital sensing device 3 can be as low as one clock period, as shown for example in the embodiments of FIGS. 6, 8, 9, 10 and 14.

The protection method and device according to the embodiments of the invention may be used in a wide range of communication and data processing applications such as in the car industry applications to ensure anti-theft protection, in service provider systems to secure access cards, in RFID tags and electronic keys, in mobile phone devices to authenticate the control and access to batteries and accessories, in manufacturing of embedded devices and equipments to provide a protection of hardware and software algorithms against cloning and reverse engineering, in banking industry to secure banking accounts and financial transactions, etc.

In one embodiment, the digital sensor 3 may be configured to detect ElectroMagnetic Fault Injection (EMFI) attack to reduce false positives.

An EMFI (ElectroMagnetic Fault Injection) is almost uniquely characterized by the following characteristics:

an EMFI threat must be of substantial amplitude to be effective;

an EMFI threat has both positive and negative deviations of value, owing to resonance and then damped vibrations;

an EMFI threat lasts for a long time (the EMFI can be compared as an earthquake as it propagates and has bounces);

an EMFI threat can however slow down a sensor and to accelerate the cryptosystem, thereby causing undetected faults.

To detect an ElectroMagnetic Fault Injection (EMFI) attack to reduce false positives, the digital sensor 3 may perform a binary check during N cycles over M cycles, where 1≤N≤M. The binary check consists in checking whether the status value is above a pre-determined maximal threshold or below a pre-determined minimal threshold. In either of these two later cases, the binary check may return 'True' or 'False'. This enables validating a certain persistency of the stress. The digital sensor 3 may be further pruned by keeping the same range of stress detection, while lowering the measurement accuracy (hence saving area at the expense of numerical resolution).

The false alarms (or "false positives") rate of N cycles over M cycles can be advantageously implemented in an area wise manner using a Finite State Machine (FSM).

Figure 15:
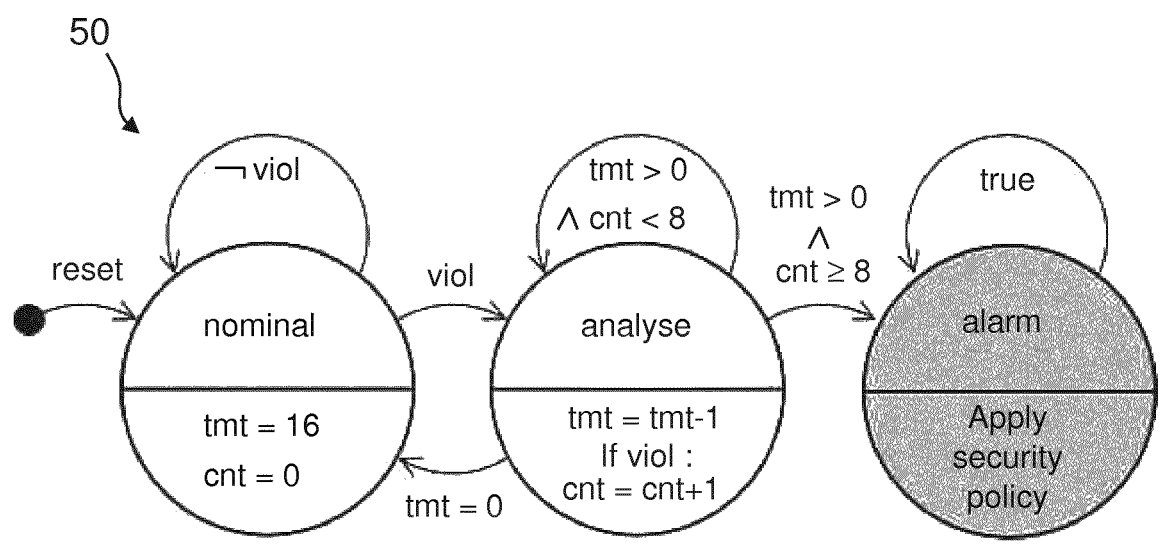
FIG. 15 depicts a FSM used to implement false alarms according to an embodiment.

FIG. 15 depicts a FSM used to implement false alarms according to an embodiment.

The FSM 50 of FIG. 15 is configured to raise an alarm only if there is detected a violation of threshold during N=8 cycles out of a window of M=16.

As shown in FIG. 15, a decision for raising an alarm may be triggered in response to the detection of a violation. A violation, represented by the signal 'viol', is detected if the digital sensor status exceeds a given value and/or underflows a given value. If a violation is detected, a timeout, represented by the signal 'tmt', is set to M, and the number of violations within this time window (timeoout) of M clock cycles is counted by a signal 'cnt' (representing a counter signal). The 'tmt' signal is decreased by one at each clock cycle. The values of N and M can be saved in a programmable memory such as an OTP (One-Time Programmable) memory. The 'cnt' signal is incremented each time a violation is detected. If 'cnt' reaches the number N before the timeout reaches the value '0' (zero), then the FSM enters in an alarm state. Advantageously, the FSM 50 is compact and can be implemented in hardware for real time analysis. Further, the FSM 50 can implement the definition of some constants, such as the way to compute the signal 'viol' from the signal 'status', and the values of N and M. Therefore, the calibration of the FSM can be done after fabrication, which has particular advantages in applications of the invention where the Digital sensor 3 is fabricated using advanced CMOS technological processes for which the variability is very large.

According to the embodiment of FIG. 15, the violation signal «viol»can be computed using smaller maximal threshold and/or higher minimal threshold (tighter bounds) than in the case of a «decide at each clock»approach (M=N=1). Being stricter on threshold, more violations are reporting over time. However, the finite state machine may issue an alarm only if M of them is reported in N clock cycles, like in a «decide at each clock»approach, to cross-check in time the likelihood for the alarm to originate from an intentional (i.e., malicious) perturbation.

Figure 16:
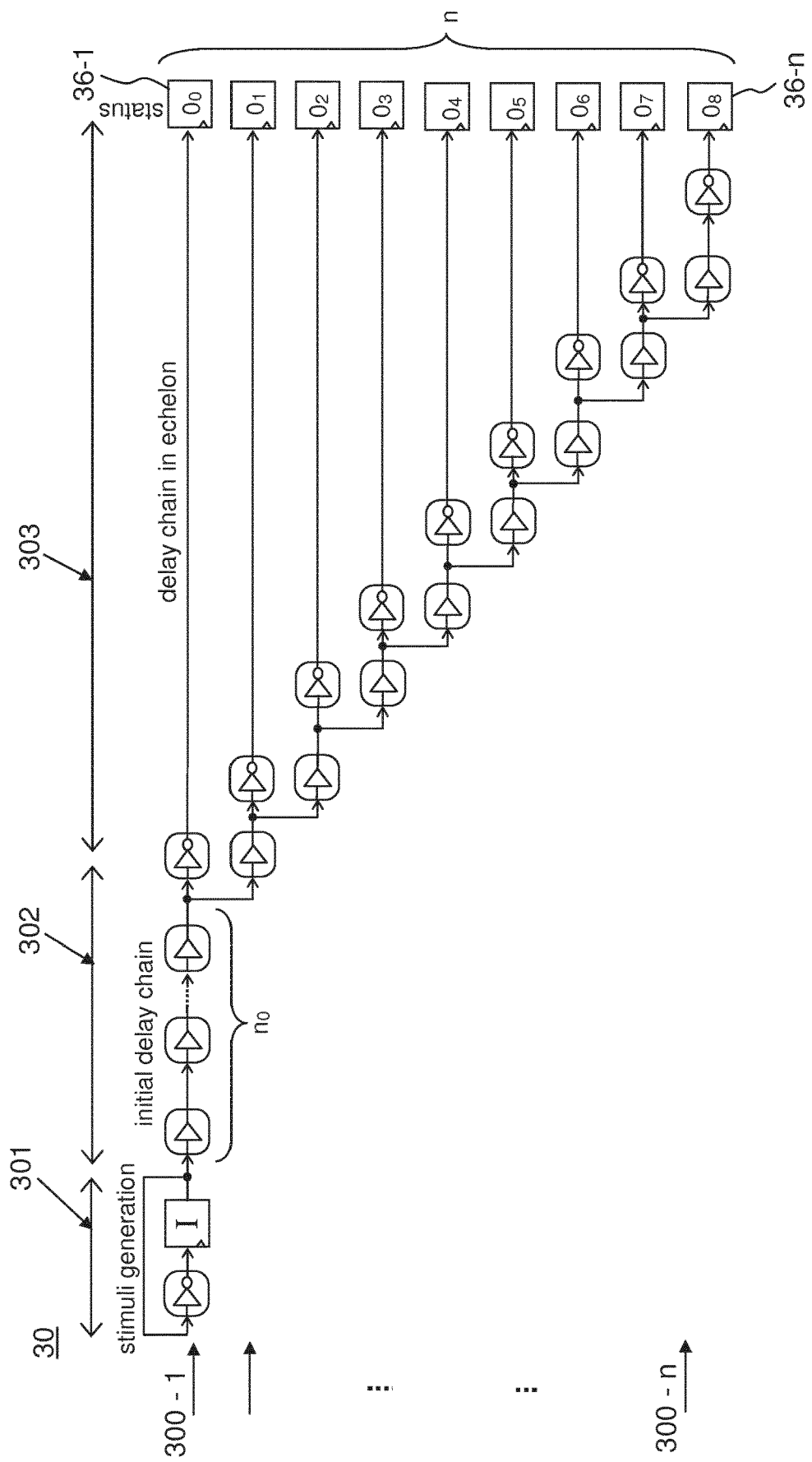
FIGS. 16, 17 and 18 depict examples of zero, one and two times pruning respectively.
Figure 17:
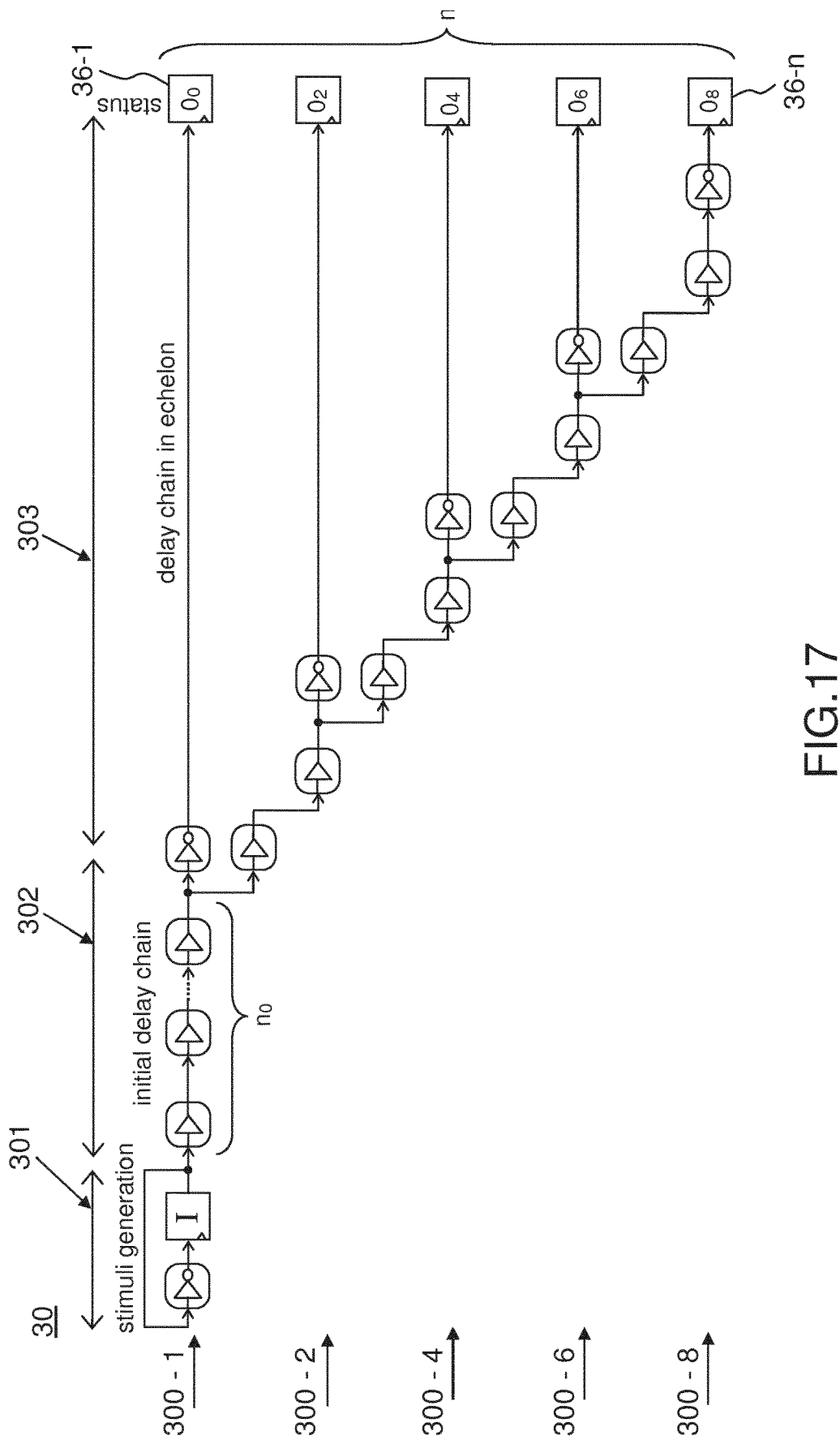
Figure 18:
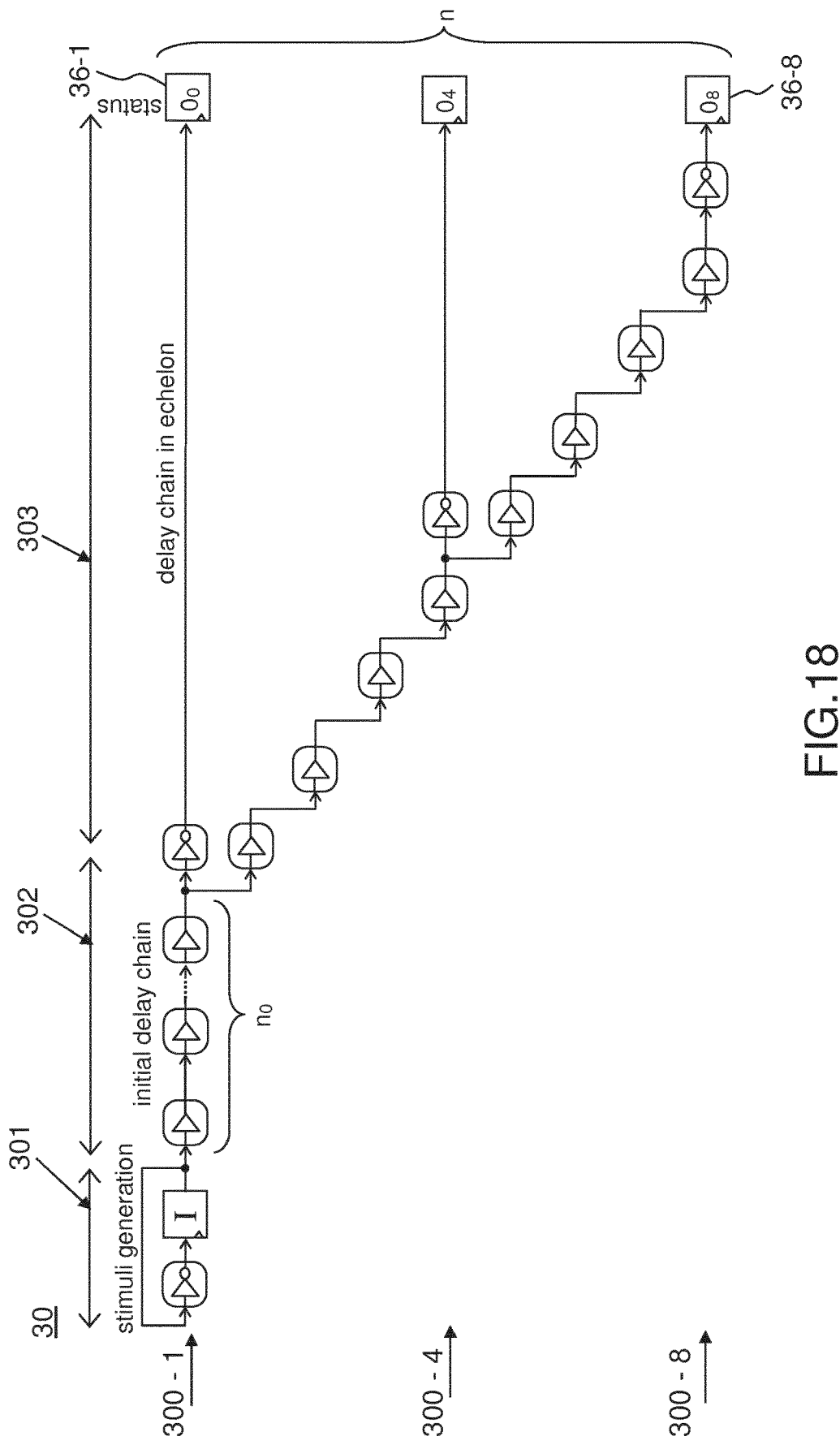

In some embodiments, a number of status bits (status gates) of the output vector 36 corresponding to least significant bits (LSBs) may be dropped to enable area saving. FIGS. 16, 17 and 18 depict examples of zero, one and two times pruning respectively.

In FIG. 16, no output bits $O_i$ are dropped while in FIG. 17 (one bit of resolution is dropped:output bits $O_i$ of impair index such as $O_1$, $O_3$ . . . ) and in FIG. 18, two bits of resolutions are dropped (for example, for each output bit $O_i$, for i=0 to n, output bit $O_i$ is kept while output bits $Oi+1$, $Oi+2$ and $Oi+3$ are dropped). It should be noted that although the dropped output bits are represented in light gray color in FIGS. 17 and 18, they actually correspond to removed gates. Accordingly, in FIG. 17, half of the status bits (an upward logic) are pruned, and in FIG. 18 the last two LSBs have their supporting logic pruned (($2^i$-1) bits are dropped for i dropped bits of resolution). For example, for an output vector 36 comprising n=32 bits, dropping thrice (hence keeping only bits since the number of status bits are divided by two each time a bit of resolution is withdrawn), the area is about halved.

Figure 19:
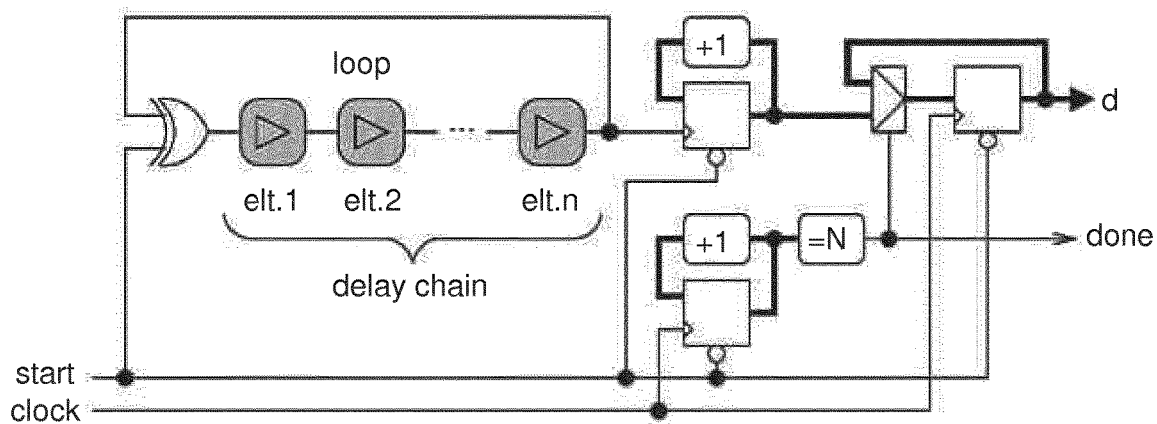
FIG. 19 is a diagrammatic view of a digital sensor, according to an embodiment.

FIG. 19 shows the structure of a digital sensor according to embodiments in which the digital sensor 3 is configured to transduct to frequency.

As used herein, the term 'transducts to frequency' refers to the measurement of a frequency by the digital sensor 3 as the number d of rounds in a loop of n elements after N system clock cycles.

Figure 20:
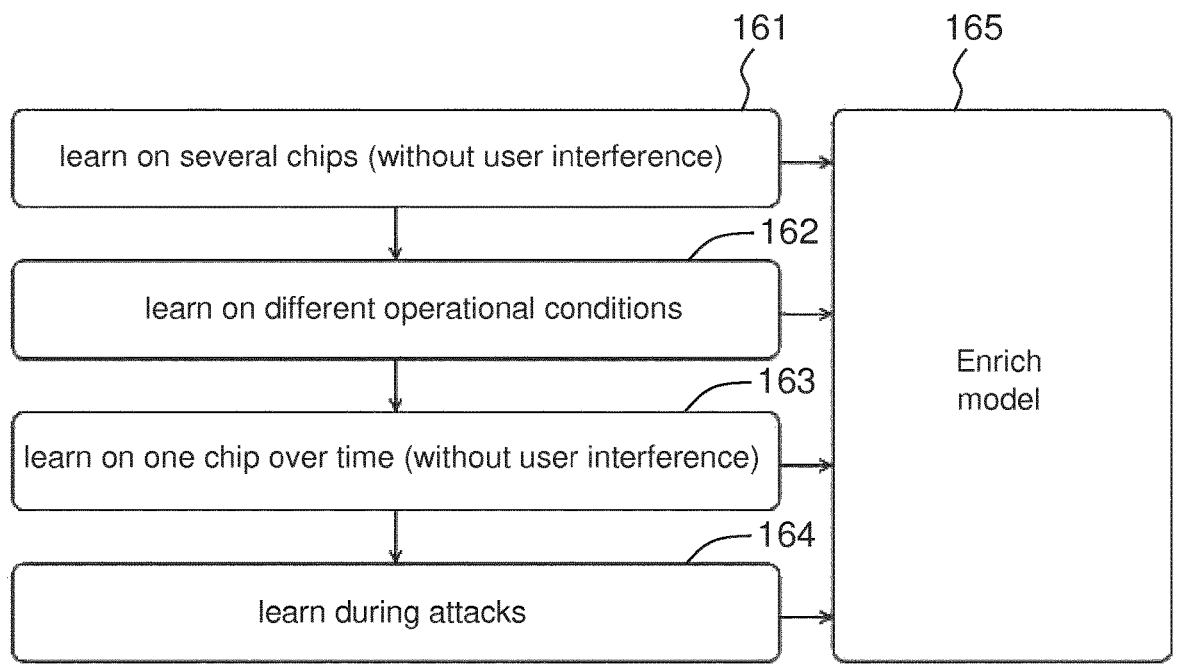
FIG. 20 is a flowchart depicting a method for deriving a classification model, according to some embodiments using machine learning techniques.

FIG. 20 is a flowchart illustrating the steps implemented during the first and the second phases of the model learning method to build a classification model taking into account both benign and malicious environmental conditions. Steps 161 to 163 correspond to the three steps of the first model learning phase that are performed offline when the target circuit is not under attacks. Step 164 corresponds to the second learning phase performed when the target circuit is under one or more attacks. The output of these steps is used as input of the step 165 performed to enrich/refine the model.

Accordingly, at step 161, model learning may be performed on several circuits/chips without user interference.

At step 162, model learning may be performed considering different operational conditions.

At step 163, model learning may be performed on a single chip over a predefined time learning interval.

At step 164, model learning may be performed when the target circuit undergoes one or more attacks considering different attack conditions and environmental perturbations.

Figure 21:
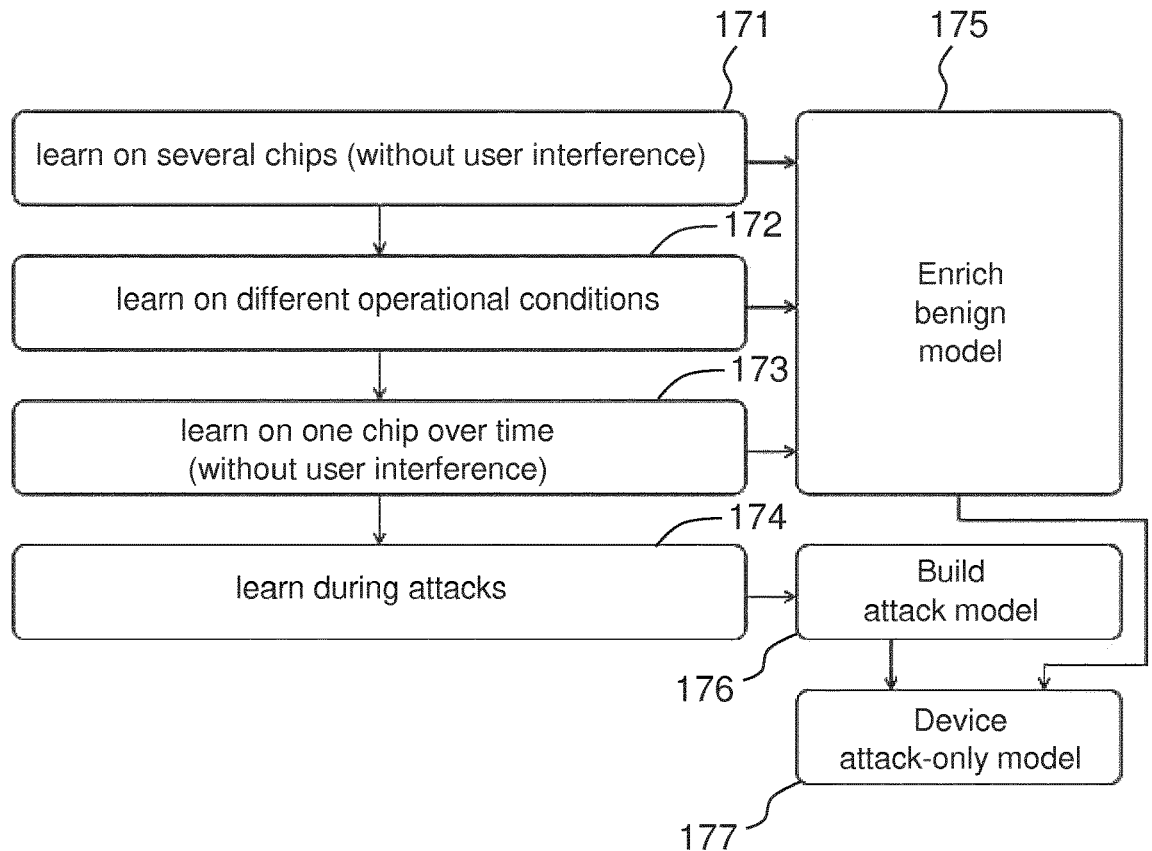
FIG. 21 is a flowchart depicting a method for building an attack-only model, according to some embodiments.

FIG. 21 is a flowchart illustrating the steps of a ML-based learning and classification method based on merging the models learnt during the first and second learning phases of ML-based classification. Indeed, the models learnt from data collected at steps 171 to 174 are independent. The method enables exploiting such decorrelation to merge the models into one model and build a specific learning method and an attack-only model. Accordingly, at step 171, model learning may be performed on several circuits/chips. At step 172, model learning may be performed considering different operational conditions. At step 173, model learning may be performed by applying one or more perturbation attacks to the target circuit 1. At step 175, the output learning data generated at each of the steps 171, 172, and 173 may be merged to enrich/update the benign model that depends on the environmental variability only.

At step 176, an attack model may be built from the learning data generated at step 174 when the target circuit undergoes one or more perturbation attacks.

At step 177, an attack-only model may be derived by subtracting the benign model determined at step 175 from the attack model produced at step 176.

Figure 22:
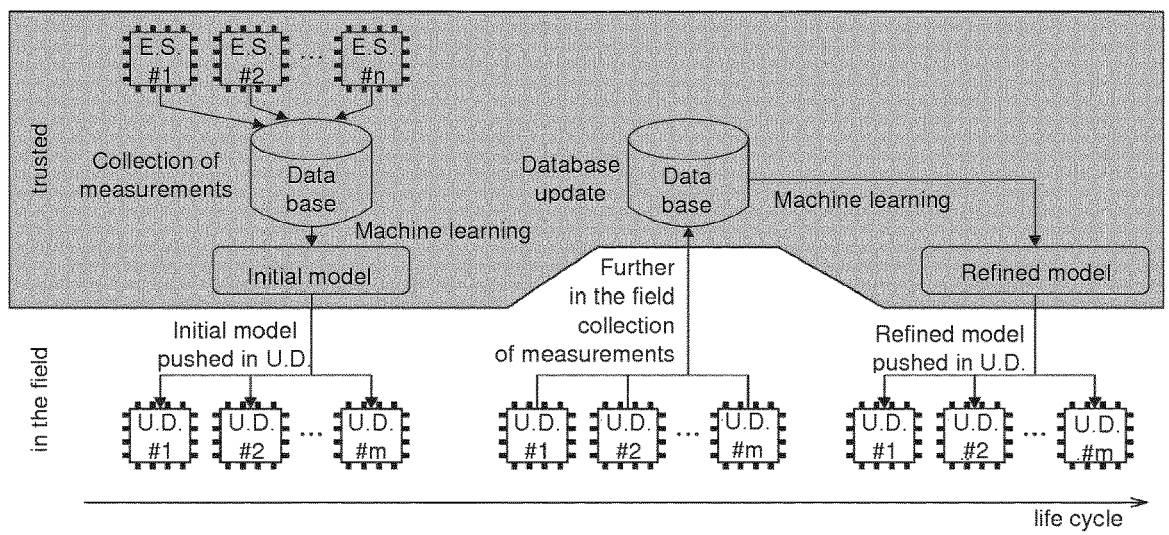
FIG. 22 is a diagrammatic view of a system in which machine learning methods are used to refine on the field-learned attack model, according to some embodiments.

FIG. 22 illustrates a system in which machine learning techniques according to some embodiments of the invention are used to monitor remotely the behavior of user devices (UD) and to acquire information during the life cycles of such devices. Machine learning techniques exploit data acquired in-the-field (also referred to as 'in-the-field-measurements') to refine classification/attack model. Accordingly, n engineering samples (ES), with n varying between 10 to 100, may be produced and collected in a database. This collected data may use machine learning techniques to built an initial model pushed in the field on a plurality of user devices. Further in the field collection of measurements enables updating the data base storing the in-field-measurements and refining the model during the life cycle of the user devices that may integrate the refined model after deployment in the field.

The embodiments of the invention may be implemented in hardware, in software and/or in a combination of software and hardware, for example using application specific integrated circuits (ASIC), a general purpose computer or any other hardware equivalents.

In particular, the methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

In addition, program code described herein may be identified based upon the application or software component within which the program code is implemented in a specific embodiment of the invention.

Figure 23:
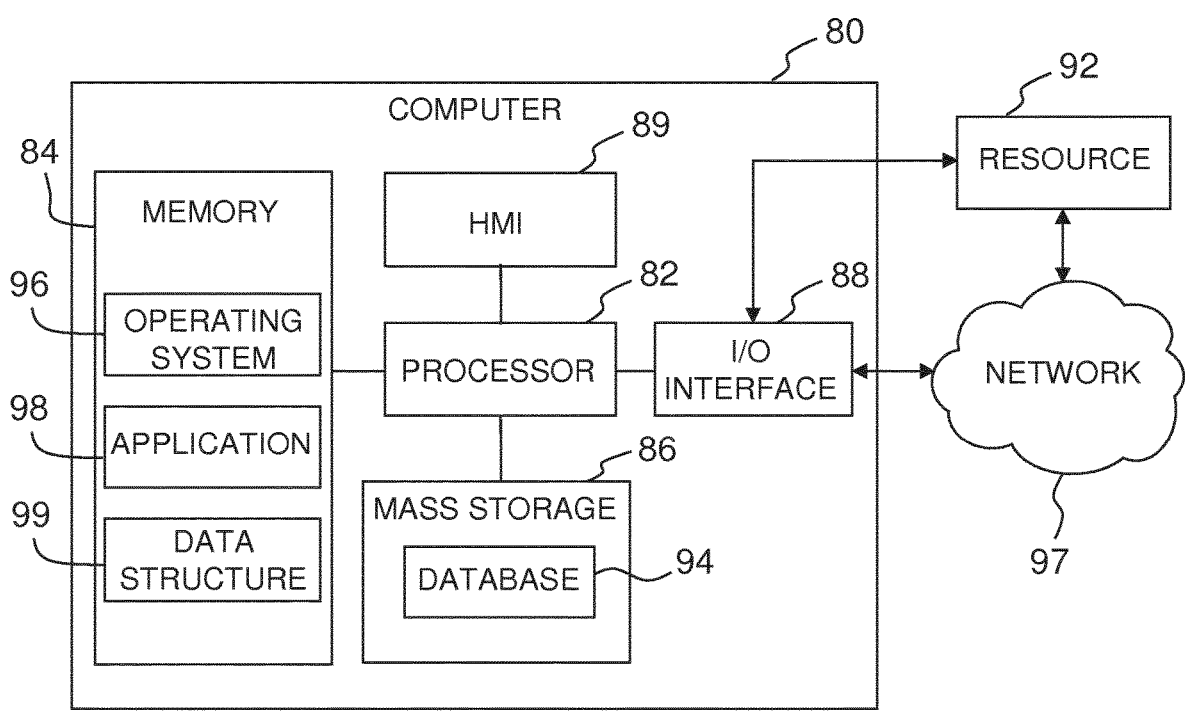
FIG. 23 is a diagrammatic view of an exemplary computing system for implementing the digital sensor.

FIG. 23 is a high-level block diagram of a general-purpose computer suitable for implementing a part or all of the functions of the analysis unit 31, according to some embodiments of the invention.

As shown in FIG. 23, a part or all the functions of the analysis unit 31 may be implemented on one or more computing devices or systems, referred to collectively as a computer, such as computer 80. The computer 80 may include a processor 82, a memory 84, a mass storage memory device 86, an input/output (I/O) interface 88, and a Human Machine Interface (HMI) 89. The computer 80 may also be operatively coupled to one or more external resources 92 via the network 97 and/or I/O interface 88. External resources may include, but are not limited to, servers, databases, mass storage devices, peripheral devices, cloud-based network services, or any other suitable computing resource that may used by the computer 80.

The processor 82 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 84. Memory 84 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 86 may include data storage devices such as a hard drive, optical drive, tape drive, non-volatile solid state device, or any other device capable of storing information. A database 94 may reside on the mass storage memory device 86, and may be used to collect and organize data used by the various systems and modules described herein.

Processor 82 may operate under the control of an operating system 96 that resides in memory 84. The operating system 96 may manage computing resources so that computer program code embodied as one or more computer software applications, such as an application 98 residing in memory 84, may have instructions executed by the processor 82. In an alternative embodiment, the processor 82 may execute the application 98 directly, in which case the operating system 96 may be omitted. One or more data structures 99 may also reside in memory 84, and may be used by the processor 82, operating system 96, and/or application 98 to store or manipulate data.

While embodiments of the invention have been illustrated by a description of various examples, and while these embodiments have been described in considerable detail, it is not the intention of the applicant to restrict or in any way limit the scope of the appended claims to such detail.

In particular, it should be noted that the invention is not limited to particular types of sensors.

The sensors 300 may include for example "environmental sensors" comprising:
one or more sensors configured to measure the temperature, and/or
one or more sensor such as MEMS (Microelectromechanical systems) to measure movement, and/or
one or more sensors configured to measure voltage, such as brownout sensors (measuring power supply drops), and/or
one or more sensors configured to measure frequency, for example to detect issues related to the clock signal, such as overclocking).

It should be noted also that the sensors can be instantiated specifically for security reasons, such as:
light sensors which may be configured to detect that the device package has been opened,
laser sensors which are configured to measure currents in substrate,
invariants of some properties, detecting functional errors.

Further, it should be noted that each sensor 300 can be a logic sensor. Such a logic sensor may wait for the operating system (OS) to emit some security events (for instance, those logged in "/var/log/dmesg" under GNU/Linux OS) or invalid events (illegal instruction, stack overflow, memory segmentation violation, abnormal return codes for functions or programs, etc.).

Additional advantages and modifications which may result from combination of some embodiments, will readily appear to those skilled in the art. The invention in its broader aspects is therefore not limited to the specific details, representative methods, and illustrative examples shown and described.

The invention claimed is:

1. A device for protecting an Integrated Circuit from perturbation attacks, wherein the device comprises;
a sensing unit configured to detect a perturbation attack, said sensing unit comprising a set of digital sensors comprising at least two sensors, the sensors being arranged in parallel, each digital sensor providing a digitized bit output having a binary value, in response to input data, the sensing unit being configured to deliver at least one binary vector comprising a multi-bit value, said multi-bit value comprising at least two bit outputs provided by said set of digital sensors, the device further comprising;
an analysis unit, the analysis unit being configured to receive at least one binary vector provided by said sensing unit, the analysis unit being configured to detect the perturbation attack from said at least one binary vector,
wherein each sensor of the sensing unit is implemented in a form of a digital circuit comprising an input memory block for storing the input data, a first data path for propagating the input data and forming a first delay chain, and a second data path for propagating the input data and forming a second delay chain, the input memory block and the second data path further comprising combinatorial cells configured to determine the bit output of said sensor using the input data,
wherein the device further comprises an output memory configured to store the bit outputs delivered by said sensors, the output memory comprising an output memory element associated with each sensor for storing the bit output delivered by said sensor,
wherein an i-th component of a binary vector is a bit output $O\_i$ delivered by a n i-th sensor or an output bit derived from the one or more output bits delivered by the sensors, and
wherein the device comprises an analysis unit configured to determine, in response to a detection of the perturbation attack, a quantity Q representing a quantitative estimation of the detected perturbation attack and/or a classification of the detected perturbation attack from said at least one binary vector.

2. The device of claim 1, wherein the input memory block comprises an input memory element for storing the input data generated using a stimuli generator, the first data path being configured to propagate data from the input memory element to a buffer element which buffers the data propagated through an initial delay chain.

3. The device of claim 2, wherein the second data path of a given sensor forms a delay chain in echelon, the second data path propagating the bit value from the buffer element to the output memory associated with said given sensor.

4. The device of claim 1, wherein the device further comprises a register configured to store the value of the bit outputs delivered by said sensors at different instant times.

5. The device of claim 1, wherein the sensing unit comprises at least one pair of the digital sensors, each pair of digital sensors comprising a reference sensor and a redundant sensor, the sensors of each pair of digital sensors being adjacent, the reference sensor and the redundant sensor being interleaved, the sensing unit being configured to deliver a first vector comprising the bit outputs of the reference sensor and a second vector comprising the bit outputs of the redundant sensor, the analysis unit being configured to classify the detected perturbation attack from a comparison between the first vector and the second vector.

6. The device of claim 5, wherein the first vector and the second vector have a same bit size, the analysis unit being configured to classify the detected perturbation attack as a local attack if the analysis unit determines that the first vector and the second vector differ with respect to each other in Hamming distance of a value strictly greater than one.

7. The device of claim 5, wherein the analysis unit is further configured to classify the detected perturbation attack as a local attack if the analysis unit determines that successive values of the first vector and the second vector differ with respect to each other in Hamming distance of a value strictly greater than one.

8. The device of claim 1, wherein tea nominal value of the bit outputs is set to zero and the analysis unit is configured to classify the detected perturbation attack as a local attack by further determining whether the bit outputs are not monotonous.

9. The device of claim 1, wherein the analysis unit comprises an aging function configured to estimate an aging level of the integrated circuit, the sensing unit comprising at least a Static Random-Access Memory Physically Unclonable Function (SRAM PUF), each output of the SRAM PUF corresponding to a sensor output.

10. The device of claim 9, wherein the analysis unit is configured to compute an attack risk level from the estimate aging level.

11. The device of claim 1, wherein the digitized bit output is provided by each digital sensor at each clock period of a system clock, digitized bits provided at a given clock period being monitored at every clock period or at each clock period of said system clock.

12. The device of claim 1, wherein the analysis unit comprises a classifier configured to classify alarms as false or true positives from digitized bit outputs provided by the set of digital sensors, said classifier implementing a machine learning algorithm chosen in a group comprising Support Vector Machines, Random Forests, Bayes, Rotation Forest, multiboost algorithm, and clustering algorithm.

13. The device of claim 12, wherein said classifier is configured to build an attack classification model by performing a first learning phase and a second learning phase, said first learning phase comprising determining sensor outputs using one or more other integrated circuits, determining the sensor outputs in different operational conditions, and determining the sensor outputs over a predefined learning time interval, said second learning phase comprising performing one or more attacks to said integrated circuit.

14. The device of claim 1, wherein the sensing unit comprises additional heterogeneous sensors configured to generate output data by monitoring different physical parameters and/or different software activities performed by said integrated circuit, said analysis unit being configured to aggregate output data generated by at least some of said additional heterogeneous sensors and to select the additional heterogeneous sensors that have a lowest variability.

15. The device of claim 14, wherein an additional sensor is chosen in a group comprising software sensors configured to monitor activities of a processor or a given peripheral of the integrated circuit, software sensors configured to monitor congestion on a system bus, software sensors configured to monitor hardware performance counters, software sensors configured to monitor software stack, physical sensors configured to measure temperature or pressure or voltage or frequency or light or current in substrate or movement.

16. The device of claim 1, wherein one or more of said digital sensors are configured to upload the digitized bit output to a remote uplink server, said remote uplink server being configured to update a classification model depending on said digitized bit.

17. The device of claim 9, wherein the aging function is configured to measure the value of each bit delivered by a Static Random-Access Memory Physically Unclonable Function (SRAM PUF), and compute a mean value taking into account the measured bit values, the mean value representing an estimation of a reliability of the SRAM-PUF, the analysis unit being configured to determine the aging of the circuit from said reliability.

* * * * *

UNITED STATES PATENT AND TRADEMARK OFFICE
CERTIFICATE OF CORRECTION

PATENT NO. : 11,893,112 B2
APPLICATION NO. : 16/954507
DATED : February 6, 2024
INVENTOR(S) : Sylvain Guilley et al.

It is certified that error appears in the above-identified patent and that said Letters Patent is hereby corrected as shown below:

In the Claims

In Claim 8, Column 25, Line 39, "wherein tea nominal value" should be -- wherein a nominal value --.

Signed and Sealed this
Twenty-third Day of April, 2024

Katherine Kelly Vidal
*Director of the United States Patent and Trademark Office*